(12) United States Patent
Seol

(10) Patent No.: US 10,579,175 B2
(45) Date of Patent: Mar. 3, 2020

(54) ELECTRONIC DEVICE AND METHOD FOR CONTROLLING OF THE SAME

(71) Applicant: LG ELECTRONICS INC., Seoul (KR)

(72) Inventor: Jie Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/840,421

(22) Filed: Dec. 13, 2017

(65) Prior Publication Data

US 2018/0335880 A1 Nov. 22, 2018

(30) Foreign Application Priority Data

May 19, 2017 (KR) .......................... 10-2017-0062404

(51) Int. Cl.
| | |
|---|---|
| *G06F 3/041* | (2006.01) |
| *G06F 3/01* | (2006.01) |
| *G06F 21/32* | (2013.01) |
| *G06K 9/00* | (2006.01) |
| *G06F 3/047* | (2006.01) |
| *G06F 3/0481* | (2013.01) |
| *G06F 3/044* | (2006.01) |
| *G06F 21/81* | (2013.01) |
| *G06F 21/83* | (2013.01) |
| *G06F 3/0488* | (2013.01) |

(52) U.S. Cl.
CPC ............ *G06F 3/0412* (2013.01); *G06F 3/016* (2013.01); *G06F 3/044* (2013.01); *G06F 3/047* (2013.01); *G06F 3/0416* (2013.01); *G06F 3/0488* (2013.01); *G06F 3/04817* (2013.01); *G06F 21/32* (2013.01); *G06F 21/81* (2013.01); *G06F 21/83* (2013.01); *G06K 9/0002* (2013.01); *G06K 9/00087* (2013.01)

(58) Field of Classification Search
USPC .................................................. 345/173–174
See application file for complete search history.

(56) References Cited

U.S. PATENT DOCUMENTS

| | | | | |
|---|---|---|---|---|
| 2013/0038544 A1* | 2/2013 | Park | ...................... | G06F 3/0481 345/173 |
| 2014/0300574 A1* | 10/2014 | Benkley, III | ....... | G06K 9/00013 345/174 |

(Continued)

*Primary Examiner* — Kwin Xie
(74) *Attorney, Agent, or Firm* — Birch, Stewart, Kolasch & Birch, LLP

(57) ABSTRACT

An electronic device including a touch screen including a fingerprint sensing region overlapped with a touch sensing region and configured to sense a fingerprint input on the fingerprint sensing region with a second sensing resolution higher than a first sensing resolution of a touch input on the touch sensing region, and a controller configured to display a fingerprint image in the fingerprint sensing region of the touch screen, in response to an event requiring an authentication procedure, sense a fingerprint of a fingerprint touch applied to the fingerprint image, perform the authentication procedure based on the sensed fingerprint, display at least one function icon adjacent to the fingerprint image based on a result of the authentication procedure, and execute a function corresponding to the at least one function icon based on a touch applied to the at least one function icon.

19 Claims, 33 Drawing Sheets

(56) References Cited

U.S. PATENT DOCUMENTS

| | | | |
|---|---|---|---|
| 2015/0127965 A1* | 5/2015 | Hong | H04L 9/3231 |
| | | | 713/323 |
| 2015/0205993 A1* | 7/2015 | Han | G06K 9/00013 |
| | | | 345/173 |
| 2016/0048287 A1* | 2/2016 | Lee | G06F 3/0488 |
| | | | 715/767 |
| 2017/0220182 A1* | 8/2017 | Schwartz | G06F 3/0416 |
| 2019/0034058 A1* | 1/2019 | Kang | G06F 3/0488 |

\* cited by examiner

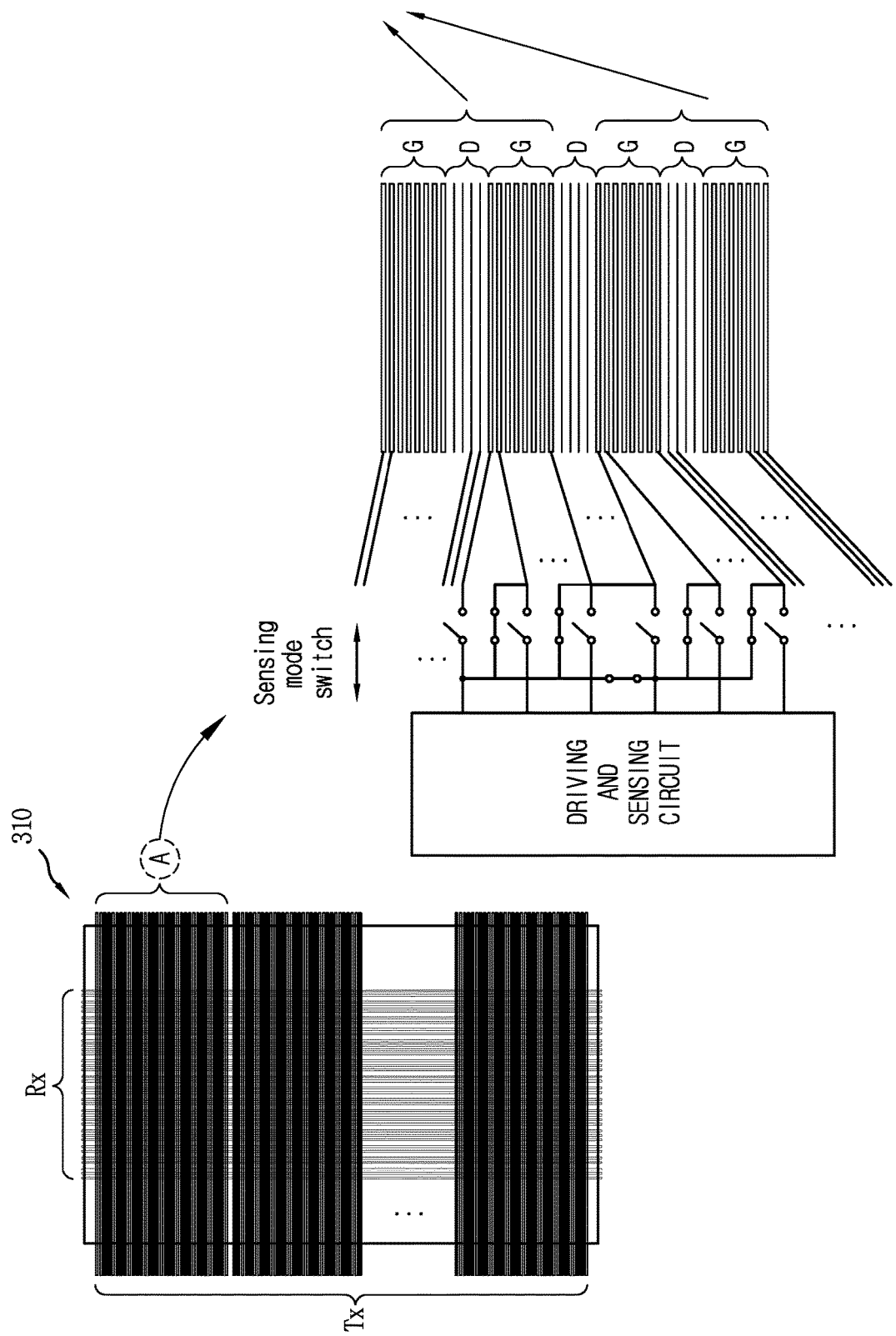

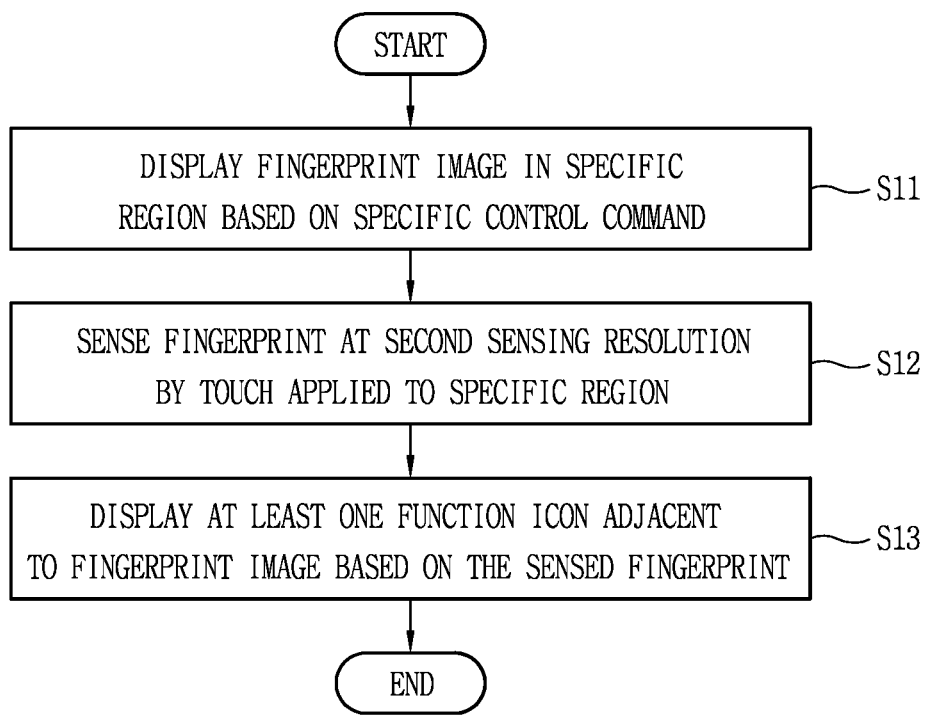

FIG. 12
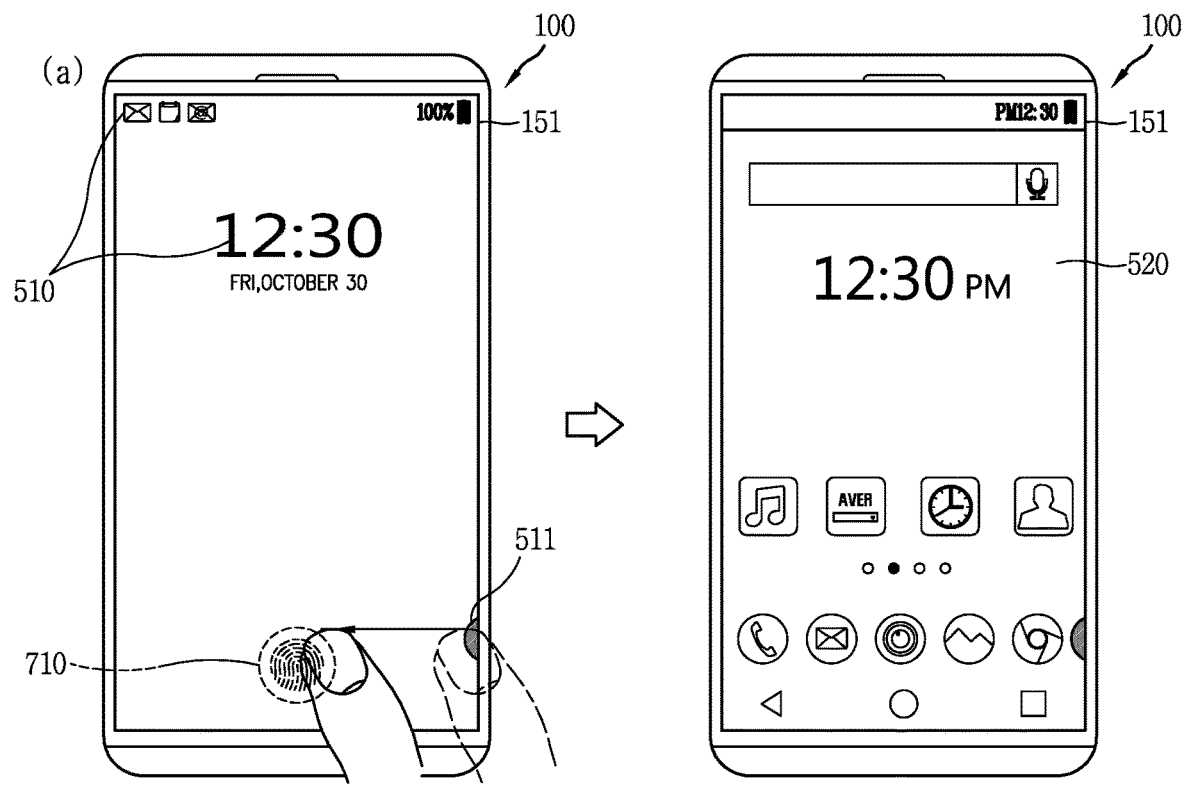
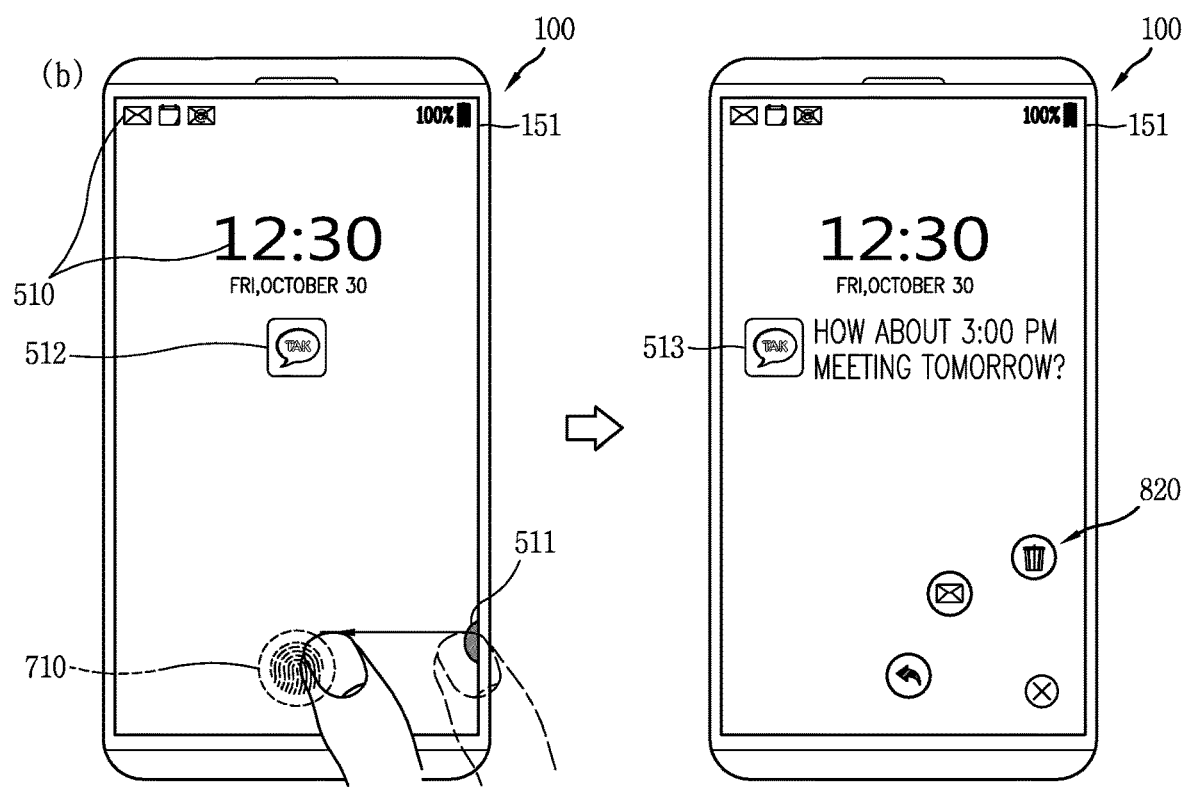

ELECTRONIC DEVICE AND METHOD FOR CONTROLLING OF THE SAME

CROSS-REFERENCE TO RELATED APPLICATION

Pursuant to 35 U.S.C. § 119(a), this application claims the benefit of earlier filing date and right of priority to Korean Application No. 10-2017-0062404, filed on May 19, 2017, the contents of which is incorporated by reference herein in its entirety.

BACKGROUND OF THE INVENTION

1. Field of the Invention

The present disclosure relates to an electronic device capable of sensing a fingerprint on a display unit.

2. Description of the Related Art

Terminals can be divided into mobile/portable terminals and stationary terminals. The mobile terminal can be further classified into two types, such as a handheld terminal and a vehicle mount terminal.

Such a terminal has various functions according to the development of technologies. For example, it is implemented in the form of a multimedia player with various functions such capturing pictures or videos, playing music or video files, playing games, receiving broadcast, and the like. Moreover, in order to support and enhance the functions of the terminal, the improvement of structural or software elements of the terminal may be taken into consideration.

In recent years, a technology for allowing fingerprint information to function as a password, such as performing an authentication procedure to release a locked state using a fingerprint among biometric information of a user is implemented in electronic devices. However, since the fingerprint information is used after an entry step for performing a specific function, additional control commands of the user may be still required in executing the function.

SUMMARY OF THE INVENTION

Accordingly, one object of the present disclosure is to solve the above-mentioned problems and other problems.

Another object of the present disclosure is to provide an electronic device that performs functions in a simpler manner using fingerprint information.

In order to accomplish the foregoing and other objects, according to an aspect of the present disclosure, an electronic device according to an embodiment of the present disclosure may include a touch screen including a display region, a window disposed on the touch screen, and a controller, wherein the touch screen comprises a touch sensing layer comprising a touch sensing region configured to receive a touch input at a first sensing resolution to sense the touch input applied to the display region, and formed in a specific region of the display region to sense a fingerprint at a second sensing resolution higher than the first sensing resolution, and the controller controls the touch screen to displays a fingerprint image in a specific region corresponding to the fingerprint sensing region within the display region based on a specific control command, and display at least one function icon adjacent to the fingerprint image based on the fingerprint sensed at the second sensing resolution.

According to an embodiment, the controller can control the touch screen to sense a fingerprint based on a touch applied to the fingerprint image, and display the at least one function icon based on a result of an authentication procedure by the sensed fingerprint. Accordingly, a preset function may be performed simultaneously with the authentication by the fingerprint.

According to an embodiment, when the touch screen is in an inactive state, only a partial region of the touch screen may be activated to display the fingerprint image based on the specific control command, and a result screen can be displayed in the partial region when the specific function is performed. Therefore, a required function may be performed without activating the touch screen.

According to an embodiment, the specific control command may correspond to any one of a generated event, sensed location information, a received wireless signal, and a touch input applied to the touch screen. Therefore, a function highly relevant to a use state of the user can be performed more quickly.

According to an embodiment of the present invention, a fingerprint image and function icons are displayed adjacent to each other in order to immediately execute a function required for a user in connection with a specific control command, thereby immediately executing a function using a function icon while at the same time sensing fingerprint information to perform an authentication procedure.

Since the specific control command may correspond to a touch input by the user, a generated event, and information sensed by a sensor, a function highly relevant to a use state of the user can be executed immediately.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A through 4C are conceptual views illustrating a control method of changing a sensing resolution of a touch sensing module;

FIG. 6 is a flowchart illustrating a method of controlling an electronic device according to an embodiment of the present disclosure;

FIG. 12 is a conceptual view illustrating a control method of displaying a related quick icon according to another embodiment of the present disclosure.

DETAILED DESCRIPTION OF THE INVENTION

Reference will now be made in detail to the preferred embodiments of the present invention, examples of which are illustrated in the accompanying drawings.

Figure 1A:
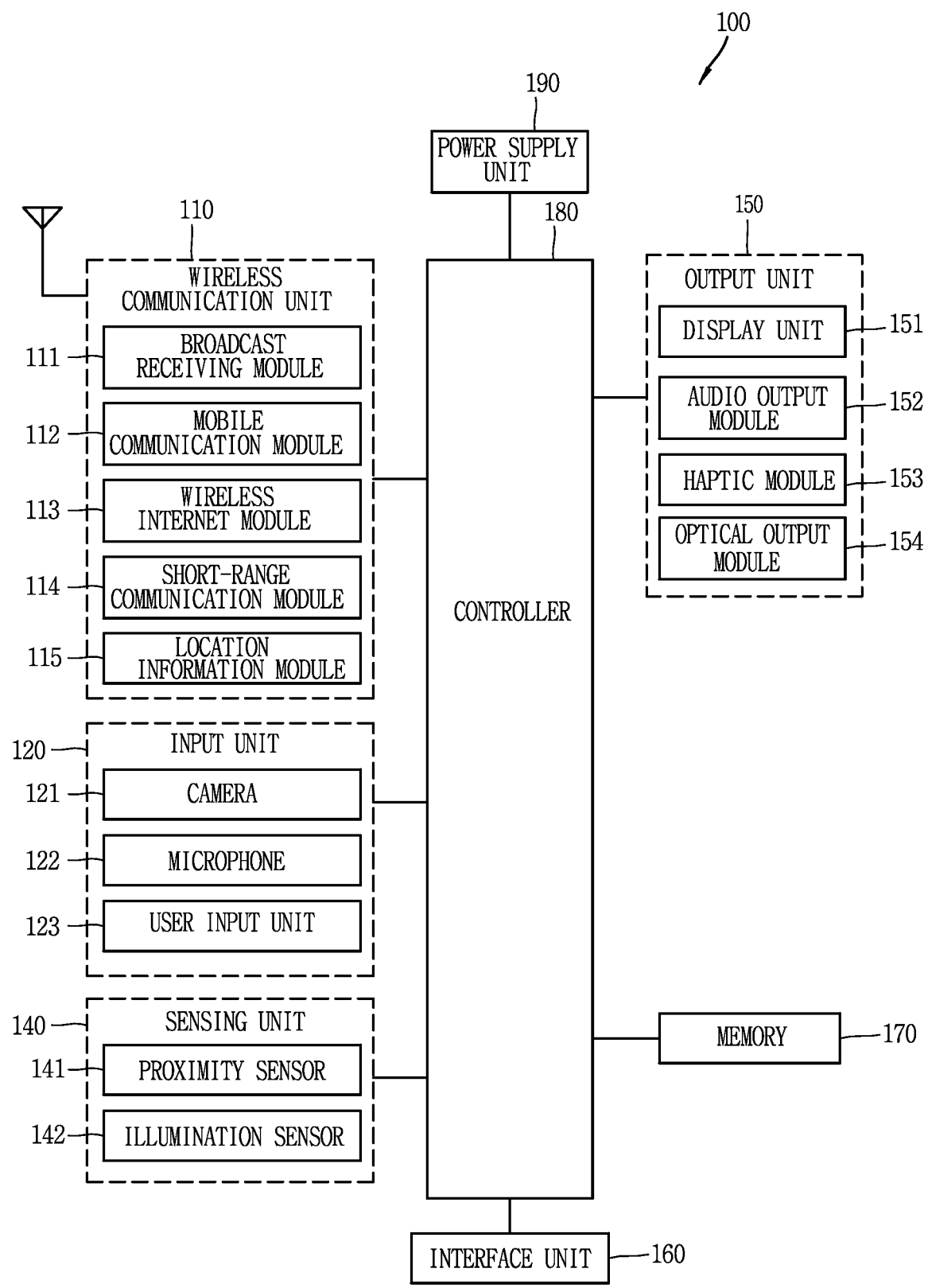
FIG. 1A is a block diagram illustrating an electronic device associated with the present disclosure.

First, FIG. 1A is a block diagram illustrating an electronic device 100 associated with the present disclosure. The electronic device 100 may include a wireless communication unit 110, an input unit 120, a sensing unit 140, an output unit 150, an interface unit 160, a memory 170, a controller 180, a power supply unit 190, and the like. FIG. 1 illustrates the electronic device 100 having various components, but it may be understood that implementing all of the illustrated components is not a requirement. Greater or fewer components may alternatively be implemented.

In more detail, the wireless communication unit 110 of those components may typically include one or more modules which permit wireless communications between the electronic device 100 and a wireless communication system, between the electronic device 100 and another electronic device 100, or between the electronic device 100 and an external server. In addition, the wireless communication unit 110 may include one or more modules for connecting the electronic device 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 is typically implemented using one or more sensors configured to sense internal information of the electronic device, the surrounding environment of the electronic device 100, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the electronic device disclosed herein may utilize information in such a manner of combining information sensed by at least two sensors of those sensors.

The output unit 150 can output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor in order to facilitate a touch screen. The touch screen may provide an output interface between the electronic device 100 and a user, as well as functioning as the user input unit 123 which provides an input interface between the electronic device 100 and the user.

The interface unit 160 serves as an interface with various types of external devices that can be coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The electronic device 100 may execute an appropriate control related to a connected external device, in response to the external device being connected to the interface unit 160.

In addition, the memory 170 stores data supporting various functions of the electronic device 100. The memory 170 is typically implemented to store data to support various functions or features of the electronic device 100. For instance, the memory 170 can store application programs executed in the electronic device 100, data or instructions for operations of the electronic device 100, and the like. At least some of those application programs may be downloaded from an external server via wireless communication. Some others of those application programs may be installed within the electronic device 100 at the time of being shipped for basic functions of the electronic device 100 (for example, receiving a call, placing a call, receiving a message, sending a message, etc.). Further, the application programs may be stored in the memory 170, installed in the electronic device 100, and executed by the controller 180 to perform an operation (or a function) of the electronic device 100.

The controller 180 can typically control an overall operation of the electronic device 100 in addition to the operations related to the application programs. The controller 180 can provide or process information or functions appropriate for a user by processing signals, data, information and the like, which are input or output by the aforementioned components, or activating the application programs stored in the memory 170.

Furthermore, the controller 180 can control at least part of the components illustrated in FIG. 1A, in order to drive the application programs stored in the memory 170. In addition, the controller 180 can drive the application programs by combining at least two of the components included in the electronic device 100 for operation.

The power supply unit 190 can receive external power or internal power and supply appropriate power required for operating respective elements and components included in the electronic device 100 under the control of the controller 180. The power supply unit 190 may include a battery, and the battery may be an embedded battery or a replaceable battery.

At least part of those elements and components may be combined to implement operation and control of the electronic device or a control method of the electronic device according to various exemplary embodiments described herein. Furthermore, the operation and control or the control method of the electronic device may be implemented in the electronic device in such a manner of activating at least one application program stored in the memory 170.

Hereinafter, each aforementioned component will be described in more detail with reference to FIG. 1A, prior to explaining various exemplary embodiments implemented by the electronic device 100 having the configuration. First, the wireless communication unit 110 will be described. The broadcast receiving module 111 of the wireless communication unit 110 can receive a broadcast signal and/or broadcast associated information from an external broadcast managing entity via a broadcast channel. The broadcast channel may include a satellite channel and/or a terrestrial channel. At least two broadcast receiving modules 111 may be provided in the electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.). Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the electronic device 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to WiBro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the electronic device 100 and a wireless communication system, between the electronic device 100 and another electronic device 100, or between the electronic device and a network where another electronic device 100 (or an external server) is located, via wireless personal area networks. The short-range communication module 114 denotes a module for short-range communications.

Here, the another electronic device 100 may be a wearable device, for example, a smart watch, smart glasses or a head mounted display (HMD), which can exchange data with the electronic device 100 (or to like data with the electronic device 100). The short-range communication module 114 can sense (recognize) a wearable device, which can communicate with the electronic device), near the electronic device 100. In addition, when the sensed wearable device is a device which is authenticated to communicate with the electronic device 100 according to the present disclosure, the controller 180 can transmit at least part of data processed in the electronic device 100 to the wearable device via the short-range communication module 114. Hence a user of the wearable device may use the data processed in the electronic device 100 on the wearable device. For example, when a call is received in the electronic device 100, the user can answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a Wi-Fi module, or both. For example, when the electronic device uses the GPS module, a position of the electronic device can be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. According to the need, the location information module 115 may perform any function of the other modules of the wireless communication unit 110 to obtain data on the location of the electronic device. As a module used to acquire the location (or current location) of the electronic device, the location information module 115 is not limited to a module for directly calculating or acquiring the location of the electronic device.

The input unit 120 can provide an audio or video signal (or information) input to the electronic device or information input by a user to the electronic device. For the input of the audio information, the electronic device 100 may include one or a plurality of cameras 121. The camera 121 processes an image frame, such as still picture or video, obtained by an image sensor in a video phone call or image capturing mode. The processed image frames can be displayed on the display unit 151. Further, the plurality of cameras 121 disposed in the electronic device 100 may be arranged in a matrix configuration. By use of the cameras 121 having the matrix configuration, a plurality of image information having various angles or focal points may be input into the electronic device 100. As another example, the cameras 121 may be located in a stereoscopic arrangement to acquire left and right images for implementing a stereoscopic image.

The microphone 122 can process an external audio signal into electric audio data. The processed audio data may be utilized in various manners according to a function being executed in the electronic device 100 (or an application program being executed). Further, the microphone 122 may include assorted noise removing algorithms to remove noise generated in the course of receiving the external audio signal.

The user input unit 123 can receive information input by a user. When information is input through the user input unit 123, the controller 180 can control an operation of the electronic device 100 to correspond to the input information. The user input unit 123 may include a mechanical input element (or a mechanical key, for example, a button, a dome switch, a jog wheel, a jog switch or the like located on a front/rear surface or a side surface of the electronic device 100), and a touch-sensitive input element. As one example, the touch-sensitive input may be a virtual key or a soft key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

Further, the sensing unit 140 can sense at least one of internal information of the electronic device, surrounding environment information of the electronic device and user information, and generate a sensing signal corresponding to it. The controller 180 can control an operation of the electronic device 100 or execute data processing, a function or an operation related to an application program installed in the electronic device based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer to the touch screen by changes of an electromagnetic field, which is responsive to an approach of an object with conductivity. In this instance, the touch screen (touch sensor) may also be categorized as a proximity sensor.

Further, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 can sense proximity touch, and proximity touch patterns (e.g., distance, direction, speed, time, position, moving state, etc.). Further, the controller 180 can process data (or information) corresponding to the proximity touches and the proximity touch patterns sensed by the proximity sensor 141, and output visual information corresponding to the process data on the touch screen. In addition, the controller 180 can control the electronic device 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor can convert changes of pressure applied to a specific part of the display unit 151 or a capacitance occurring from a specific part of the display unit 151, into electric input signals. Also, the touch sensor can sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals are transmitted to a touch controller. The touch controller can process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input can be decided based on a current operating state of the electronic device 100 or a currently executed application program.

In addition, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor can recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor. Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 can display (output) information processed in the electronic device 100. For example, the display unit 151 can display execution screen information of an application program driven in the electronic device 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals related to a particular function (e.g., a call signal reception sound, a message reception sound, etc.) performed by the electronic device 100. The audio output module 152 may include a receiver, a speaker, a buzzer or the like.

A haptic module 153 can generate various tactile effects the that user can feel. A typical example of the tactile effect generated by the haptic module 153 may be vibration. Strength, pattern and the like of the vibration generated by the haptic module 153 may be controllable by a user selection or setting of the controller. For example, the haptic module 153 can output different vibrations in a combining manner or a sequential manner.

Besides vibration, the haptic module 153 can generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 can transmit tactile effects through a user's direct contact, or a user's muscular sense using a finger or a hand. The haptic module 153 may be implemented in two or more in number according to the configuration of the electronic device 100.

An optical output module 154 can output a signal for indicating an event generation using light of a light source. Examples of events generated in the electronic device 100 may include a message reception, a call signal reception, a missed call, an alarm, a schedule notice, an email reception, an information reception through an application, and the like.

A signal output by the optical output module 154 may be implemented so the electronic device emits monochromatic light or light with a plurality of colors. The signal output can be terminated as the electronic device senses that a user has checked the generated event, for example.

The interface unit 160 serves as an interface for external devices to be connected with the electronic device 100. The interface unit 160 allows a data reception from an external device, a power delivery to each component in the electronic device 100, or a data transmission from the electronic device 100 to an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

Further, the identification module may be configured as a chip for storing various information required to authenticate an authority to use the electronic device 100, which may include a User Identity Module (UIM), a Subscriber Identity Module (SIM), and the like. In addition, the device having the identification module (also referred to herein as an "identifying device") may take the form of a smart card. Accordingly, the identifying device may be connected with the electronic device 100 via the interface unit 160.

The interface unit 160 serves as a path for power to be supplied from an external cradle to the mobile device 100 when the mobile device 100 is connected to the external cradle or as a path for transferring various command signals input from the cradle by a user to the mobile device 100. Such various command signals or power input from the cradle can operate as signals for recognizing that the electronic device 100 has accurately been mounted to the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 can operate in association with a web storage which performs the storage function of the memory 170 on the Internet.

As aforementioned, the controller 180 can typically control the general operations of the electronic device 100. For example, the controller 180 can set or release a locked state a lock state for restricting a user from inputting a control command with respect to applications when a state of the electronic device meets a preset condition.

Furthermore, the controller 180 can also perform controlling and processing related to voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the electronic device 100.

The power supply unit 190 can receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected. As another example, the power supply unit 190 can recharge the battery in a wireless manner without use of the connection port. Here, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable or its similar medium using, for example, software, hardware, or any combination thereof.

Figure 1B:
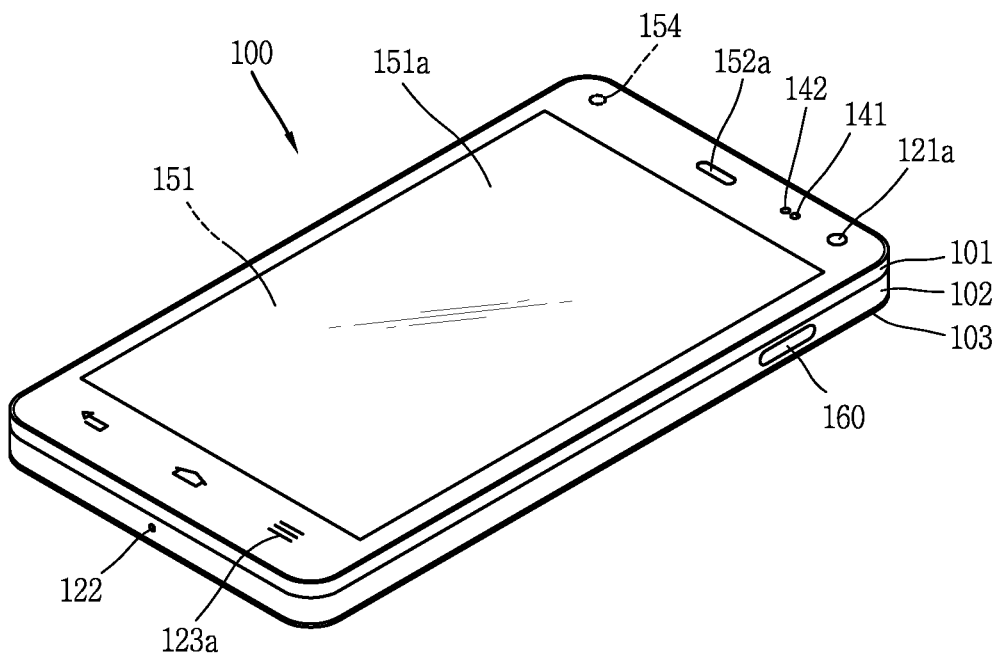
FIGS. 1B and 1C are views illustrating an example in which an electronic device of the present disclosure is seen from different directions.
Figure 1C:
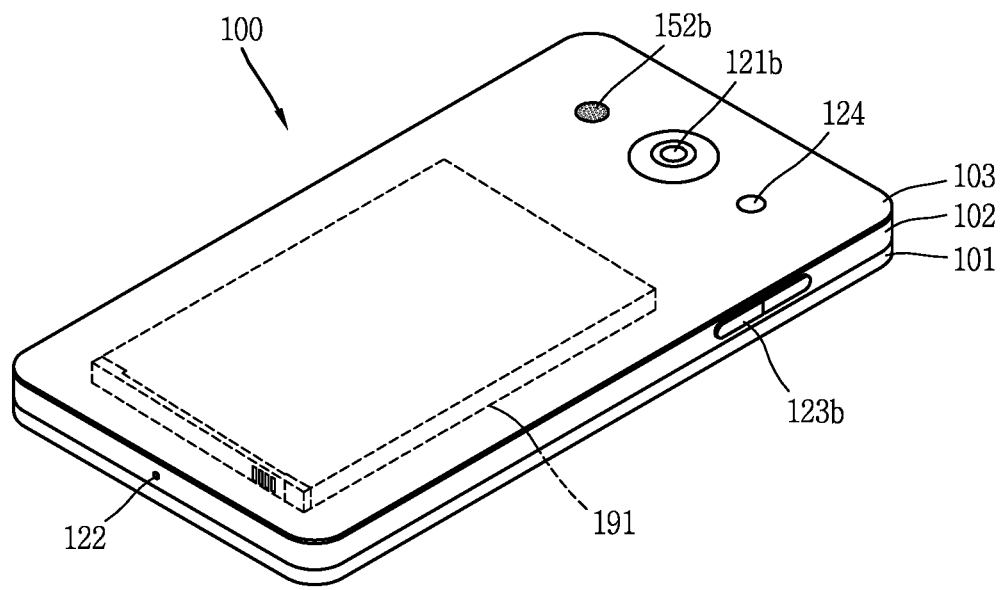

Hereinafter, a structure of an electronic device 100 according to an embodiment of the present disclosure or the terminal in which the above-described components are disposed will be described with reference to FIGS. 1B and 1C. Referring now to FIGS. 1B and 1C, the electronic device 100 is described with reference to a bar-type terminal body. However, the present disclosure is not limited to this, and may be also applicable to various structures such as a watch type, a clip type, a glasses type, a folder type in which two or more bodies are coupled to each other in a relatively movable manner, a slide type, a swing type, a swivel type, and the like. The following description in association with a specific type of mobile terminal or on a specific type of mobile terminal will be also typically applied to another type of mobile terminal.

The electronic device 100 may include a case (for example, a frame, a housing, a cover, etc.) constituting the appearance thereof. As illustrated in the drawing, the electronic device 100 may include a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 300 is detached from the rear case 102, the electronic components mounted to the rear case 102 may be externally exposed.

As illustrated, when the rear cover 300 is coupled to the rear case 102, a side surface of the rear case 102 may be partially exposed. In some cases, upon the coupling, the rear case 102 may also be completely shielded by the rear cover 300. In some embodiments, the rear cover 300 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. Unlike the example which the plurality of cases form an inner space for accommodating such various components, the electronic device 100 may be configured such that one case forms the inner space. In this example, the electronic device 100 having a uni-body formed so synthetic resin or metal extends from a side surface to a rear surface may also be implemented.

Further, the electronic device 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 300, to hermetically seal an inner space when those cases are coupled.

The electronic device 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary electronic device 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration is not limited to the arrangement. The foregoing configuration can be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 can display (output) information processed in the electronic device 100. For example, the display unit 151 can display execution screen information of an application program driven in the electronic device 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the electronic device 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor can sense this touch and the controller 180 can generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

Thus, the display unit 151 can form a flexible touch screen along with the touch sensor, and in this instance, the touch screen can function as the user input unit 123 (refer to FIG. 1A). Therefore, the touch screen can replace at least some of the functions of the first manipulation unit 123a. Hereinafter, for convenience of explanation, the display unit (display module) for outputting the image and the touch sensor are collectively referred to as a touch screen 151.

The first audio output module 152a can be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure is not limited to this and can be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the electronic device 100.

The optical output module 154 can output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 can control the optical output unit 154 to end the output of light.

The first camera 121a can process video frames such as still or moving images obtained by the image sensor in a video call mode or a capture mode. The processed video frames can be displayed on the display unit 151 or stored in the memory 170.

The first and second manipulation units 123a and 123b are examples of the user input unit 123, which may be manipulated by a user to input a command for controlling the operation of the electronic device 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure is not limited to this. For example, the first manipulation unit 123a can be configured with a mechanical key, or a combination of a touch key and a push key.

The content received by the first and second manipulation units 123a and 123b may be set in various ways. For example, the first manipulation unit 123a can be used by the user to input a command such as menu, home key, cancel, search, or the like, and the second manipulation unit 123b can be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the electronic device 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface is implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 can be implemented to have a larger screen.

Further, the electronic device 100 may include a fingerprint recognition sensor for recognizing a user's fingerprint, and the controller 180 can use fingerprint information sensed through the finger recognition sensor as an authentication means. The finger scan sensor may be installed in the display unit 151 or the user input unit 123.

The microphone 122 can receive the user's voice, other sounds, and the like. The microphone 122 may be provided at a plurality of places, and configured to receive stereo sounds.

The interface unit 160 serves as a path allowing the electronic device 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. Further, the second camera 121b may include a plurality of lenses arranged along at least one line. The plurality of lenses may also be arranged in a matrix configuration. The cameras may be referred to as an 'array camera.' When the second camera 121b is implemented as the array camera, images can be captured in various manners using the plurality of lenses and images with better qualities may be obtained. A flash 124 can be disposed adjacent to the second camera 121b. When an image of a subject is captured with the camera 121b, the flash 124 can illuminate the subject.

Further, the second audio output module 152b can be disposed on the terminal body and implement stereophonic sound functions in conjunction with the first audio output module 152a, and may be also used for implementing a speaker phone mode for call communication.

At least one antenna for wireless communication can be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 300 or a case including a conductive material may serve as an antenna.

A power supply unit 190 (refer to FIG. 1A) for supplying power to the electronic device 100 is disposed on the terminal body. The power supply unit 190 may include a battery 191 which is mounted in the terminal body or detachably coupled to an outside of the terminal body.

The battery 191 can receive power via a power source cable connected to the interface unit 160. Also, the battery 191 may be (re)chargeable in a wireless manner using a wireless charger. The wireless charging can be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the electronic device 100 can also be provided on the electronic device 100. As one example of an accessory, a cover or pouch for covering or accommodating at least one surface of the electronic device 100 may be provided. The cover or pouch may cooperate with the display unit 151 to extend the function of the electronic device 100. Another example of the accessory may be a touch pen for assisting or extending a touch input onto a touch screen.

Figure 2A:
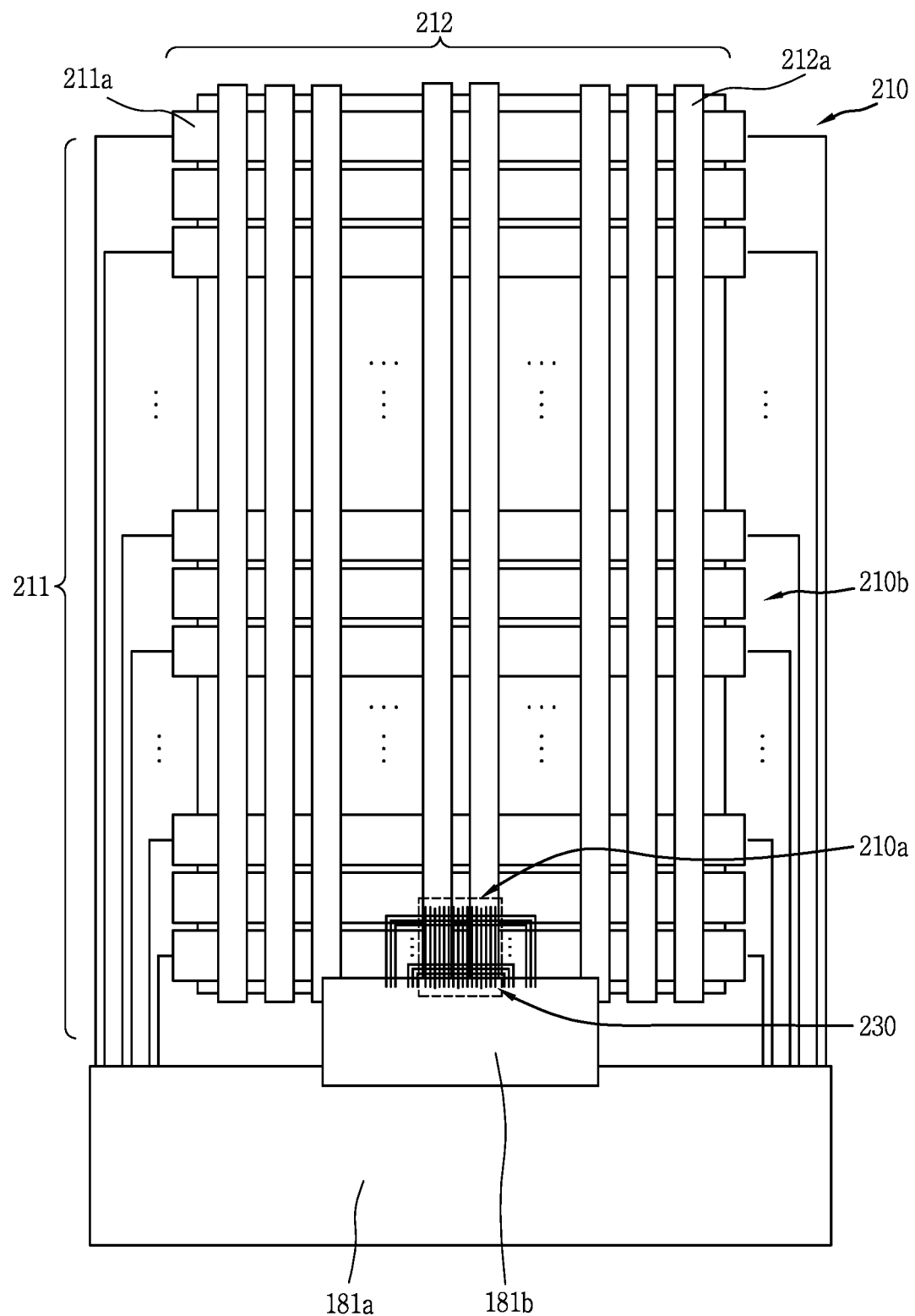
FIG. 2A is a conceptual view illustrating a structure in which a touch sensing layer and a fingerprint sensing layer are disposed.

Next, FIG. 2A is a conceptual view illustrating a structure in which a touch sensing layer 210 and a fingerprint sensing layer 230 are disposed. The touch sensing layer 210 and the fingerprint sensing layer 230 according to the present disclosure are arranged so as to correspond to a display region of the touch screen for displaying an image.

Referring to FIG. 2A, the touch sensing layer 210 includes a first sensing line portion 211 and a second sensing line portion 212. The first sensing line portion 211 includes a plurality of first sensing lines 211a extended in one direction, and the second sensing line portion 212 includes a plurality of second sensing lines 212a extended in one direction.

The first and second sensing lines 211a, 212a are arranged in an insulated state intersecting each other to sense a change in capacitance due to a touch input applied to the window 151a. Here, the first sensing line 211a corresponds to a Tx line, and the second sensing line 212a corresponds to a Rx line.

The fingerprint sensing layer 230 is disposed to overlap with a first region 210a, which is a specific region of the touch sensing layer 210. Since the fingerprint sensing layer 230 overlaps with only a partial region of the touch sensing layer 210, fingerprint information can be acquired only in a specific region of the touch screen 151. The remaining region of the touch sensing layer 210 excluding the first region 210a is defined as a second region 210b. The second region 210b senses a touch input, but does not acquire fingerprint information. However, according to the present disclosure, the first region 210a can acquire the fingerprint information or sense a touch input.

Figure 2B:
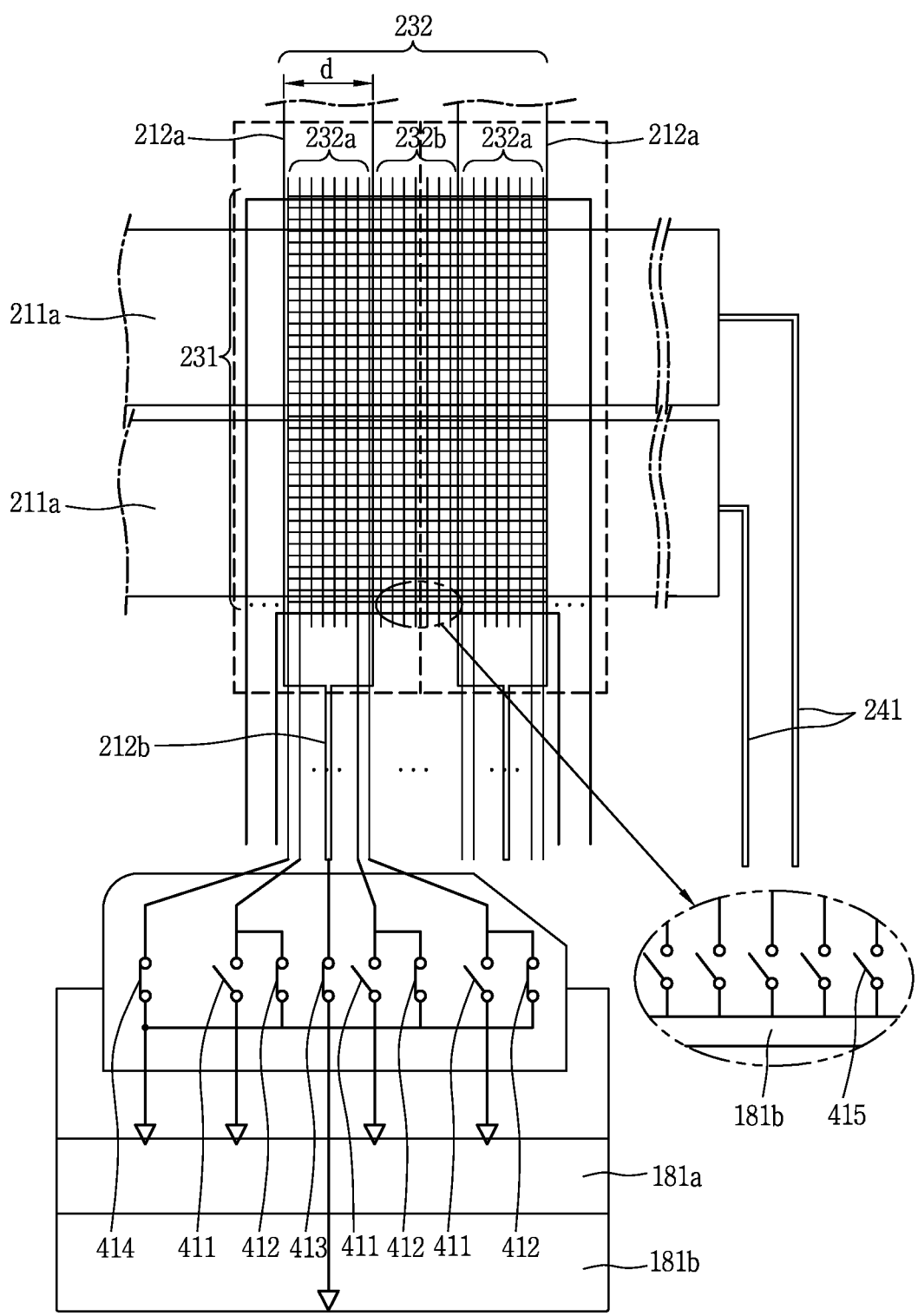
FIG. 2B is a conceptual view illustrating a driving state of a switch unit for sensing a touch input applied to the window in a touch sensing mode.

The touch sensing layer 210 senses a touch input at a first sensing resolution and the fingerprint sensing layer 230 senses fingerprint information at a second sensing resolution higher than the first sensing resolution. In addition, as shown in FIG. 2B, for example, the fingerprint sensing layer 230 includes a first fingerprint sensing layer 231 formed of a plurality of first fingerprint sensing lines extended in the one direction and a second fingerprint sensing layer 232 formed of a plurality of second fingerprint sensing lines extended in the crossing direction. The thickness of the first and second fingerprint sensor lines is formed to be smaller than the thickness (d) of the first and second sensing lines 211a, 212b. In other words, the first and second fingerprint sensing lines are arranged to be insulated from each other to sense a change in capacitance.

Since the first and second fingerprint sensing lines 231 and 232 are finely arranged, the sensing resolution of the first fingerprint sensing layer 230 can be higher than that of the touch sensing layer 210 to acquire fingerprint information. Furthermore, a part of the first and second fingerprint sensing lines 231 and 232 are overlapped with the first and second sensing lines 211a, 212a of the first region 210a. The first lines 232a of the plurality of second fingerprint sensing lines 232 overlap with the second sensing line 212, and the second lines 232b of the second fingerprint sensing lines 232 do not overlap with the second sensing line 212 (FIGS. 2A and 2B).

In addition, the controller 180 can selectively activate a touch sensing mode for receiving the touch input and a fingerprint sensing mode for acquiring fingerprint information using the touch sensing layer 210 and the fingerprint sensing layer 230. The first lines 232a of the second fingerprint sensing lines 232 overlapping with the second sensing line 212a included in the fingerprint sensing layer 230 are grouped in the fingerprint sensing mode to operate as single sensing line. Also, in the fingerprint sensing mode, the second lines 232b of the second fingerprint sensing lines 232 are short-circuited with the circuit board not to flow a current or sense a current.

The fingerprint sensing module further includes a switch unit connecting the fingerprint sensing layer 230 and the circuit board. The switch unit includes a plurality of switches connected to each of the first lines 232a. Part of the first lines 232a are selectively connected to a first and a second switch 411, 412. The remainder of the first lines 232a are connected to a fourth switch 414. In addition, the second touch sensing line 212a of the first region 210a overlapping with the first lines 232a is connected to the circuit board by a third switch 413.

In more detail, FIG. 2B is a conceptual view illustrating a driving state of a switch unit for sensing a touch input applied to the window 151a in a touch sensing mode. In the touch sensing mode, the first lines 232a are connected to the second switch 412. The second switch 412 is overlapped with one second sensing line 212a, and a plurality of first lines connected to the second switch 412 are implemented as a single sensing line. The plurality of first lines 232a implemented as a single sensing line are connected to a second circuit board 181b to sense a signal.

A plurality of second lines connected to the second switch 412 and the second sensing line 232b are connected together to form a single sensing line. The plurality of second lines, which are implemented as a single sensing line, sense a change in capacitance together with the first sensing line 211a.

A fifth switch 415 is connected to each of the second lines 232b. The second lines 232b are connected to the first circuit board 181a that senses fingerprint information. In the touch sensing mode, the fifth switch 415 short-circuits the first circuit board 181a and the second lines 232b. Accordingly, the second lines 232b become dummy lines that do not transmit or receive signals.

Figure 2C:
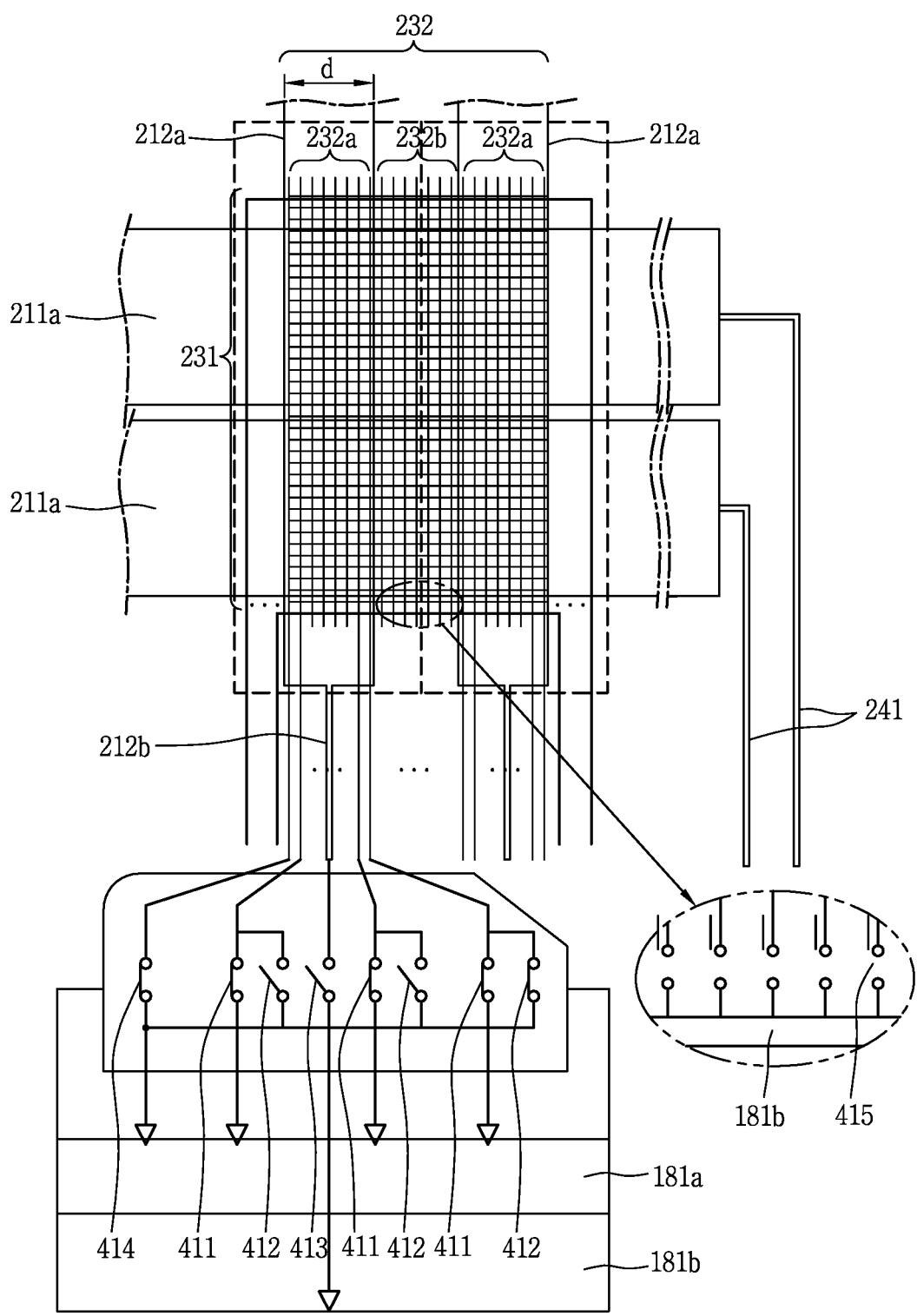
FIG. 2C is a conceptual view illustrating an operation state of a switch unit for acquiring fingerprint information of a finger in contact with a specific region on the window in a fingerprint sensing mode.

FIG. 2C is a conceptual view illustrating an operation state of a switch unit for acquiring fingerprint information of a finger in contact with a specific region on the window 151a in a fingerprint sensing mode. In the fingerprint sensing mode, the first lines 232a are connected to the first circuit board 181a by the first switch 411. Each of the first lines 232a is connected to the first circuit board 181a, and acquires the fingerprint information while sensing a change in capacitance together with the second lines 232b.

In the fingerprint sensing mode, the controller 180 can deactivate the first sensing line portion 211 and the second sensing line portion 212 of the touch sensing layer 210. Alternatively, at least part of the first and second sensing lines 211a, 212a overlapping with the fingerprint sensing layer 230 can be controlled in an inactive state. In this instance, a touch input applied to one region on the touch screen 151 can be sensed.

According to the present disclosure, when the touch sensing layer and the fingerprint sensing layer are arranged in an overlapping manner, lines included in the fingerprint sensing layer are grouped according to the touch sensing mode and the fingerprint sensing mode to sense the touch input. Accordingly, the user can also apply a touch input to one region in which the fingerprint sensing layer is disposed.

Figure 3A:
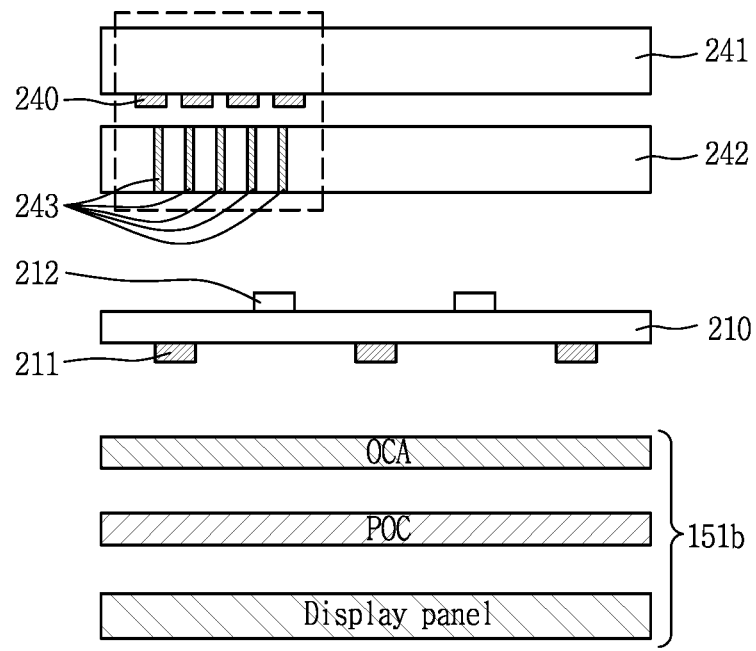
FIGS. 3A and 3B are conceptual views illustrating a structure of a touch sensing layer and a fingerprint sensing layer according to another embodiment.
Figure 3B:
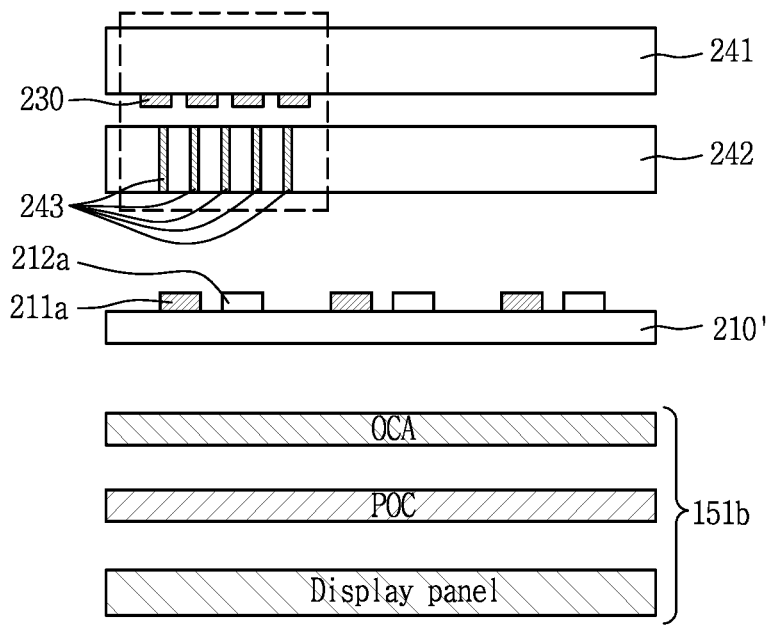

Next, FIGS. 3A and 3B are conceptual views illustrating a structure of a touch sensing layer and a fingerprint sensing layer according to another embodiment. Referring to FIG. 3A, the display module 151b includes a display panel, a polarizing layer, and an adhesive layer. The touch sensing layer 210 is adhered to the adhesive layer. As discussed above, the touch sensing layer 210 includes a first and a second sensing line portion 211, 212. The first and second touch line portions 211, 212 may be formed on both sides of a base substrate.

Referring to FIG. 3B, the first and second sensing lines 211a, 212a of the first and second sensing line portions 211, 212 included in the touch sensing layer 210' can be insulated from each other on one surface of the base substrate. In addition, the touch sensing layer 210 is electrically connected to a touch circuit board.

Further, the fingerprint sensing layer 230 is formed on the touch sensing layer 210 or 210'. The touch sensing layer 210' is formed on one surface of a first cover glass 241. Also, the one surface of the first cover glass 241 corresponds to a surface facing the touch sensing layer 210 or 210'. The fingerprint sensing layer 230 is formed on one region of the first cover glass 241 and the fingerprint sensing layer 230 is overlapped with one region of the touch sensing layer 210 or 210'.

A second cover glass 242 is disposed between the touch sensing layer 210 or 210' and the fingerprint sensing layer 230. The second cover glass 242 is formed with a connection portion 243 formed in one region corresponding to the fingerprint sensing layer 230. The connection portion 243 is formed with a plurality of holes formed in a thickness direction of the second cover glass 242, and the plurality of holes are filled with a transmissive conductive material. The connection portion 243 is disposed in a region corresponding to a line arranged in a direction parallel to an extending direction of the Rx line on the touch sensing layer 210 or 210' among a plurality of intersecting lines of the fingerprint sensing layer 230.

When a touch input is applied to a region overlapping with the fingerprint sensing layer 230, the connection portion 243 transmits an electric field generated on the touch sensing layer 210 or 210' to the fingerprint sensing layer 230 to sense the touch input. The controller 180 short-circuits the first and second fingerprint sensing units of the fingerprint sensing layer 230 and the fingerprint circuit board in the touch sensing mode. Accordingly, the second fingerprint sensing unit of the fingerprint sensing layer 230 may be used as a sensing line of the touch sensing layer.

Figure 4B:
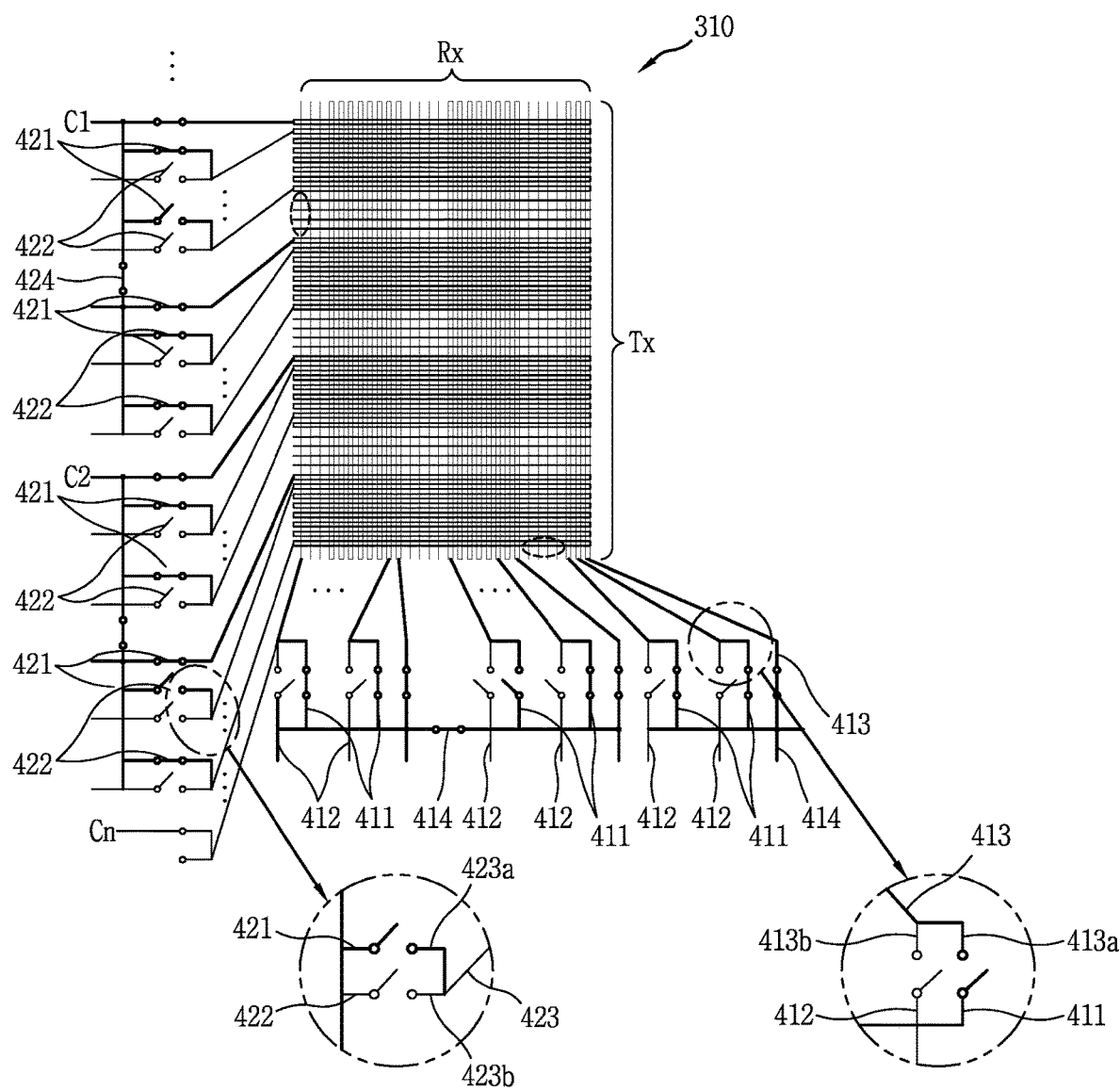
Figure 4C:
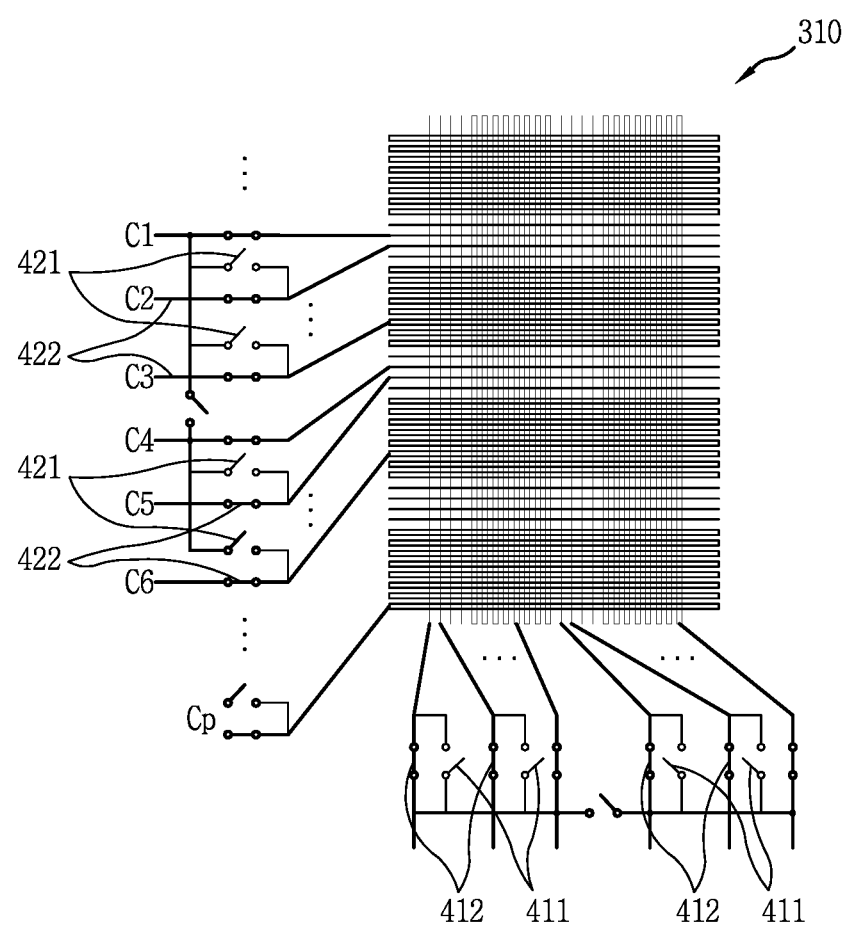

FIGS. 4A through 4C are conceptual views illustrating a control method of changing a sensing resolution of a touch sensing module. Referring to FIG. 4A, the touch sensing layer 310 includes first lines (Rx) and second lines (Tx) arranged in directions intersecting each other. The first lines constitute the first sensing layer, and the second lines constitute the second sensing layer.

The first and second lines are respectively connected to a switch unit. At least part of the plurality of first lines are connected to a plurality of first switches or second switches, respectively, and electrically connected to the circuit board. One first line connected to the first switch is grouped with other first lines connected to the first switch and, connected to the circuit board as one first line. In other words, adjacent first lines are formed as a single sensing line when they are respectively electrically connected to the circuit board by the first switch. As a result, a sensing resolution for sensing a touch of a finger is reduced. Accordingly, the touch sensing module has a first sensing resolution capable of sensing a typical touch input.

Further, when the first line is electrically connected to the circuit board by the second switch, the one first line is electrically connected to the circuit board by a single sensing line. As a result, the sensing resolution increases. Accordingly, the touch sensing module has a second sensing resolution that senses a finer touch than a typical touch input to sense a fingerprint of a finger.

Hereinafter, a control method of changing the sensing resolution will be described with reference to FIGS. 4B through 4D. In particular, FIG. 4B is a conceptual view illustrating the operation of a touch sensor module having a first sensing resolution for sensing a typical touch input. Referring to FIG. 3B, the touch sensing layer 310 is connected to the circuit board 181 by a connection line portion, and the connection line portion is controlled based on a mode.

Each of the first and second lines is connected to both the first and second switches 411, 412. The first and second switches 411, 412 control connections and short-circuit. The first switch 411 groups each of the first lines to form a plurality of sensing lines, and the second switch 412 forms the first and second lines as respective sensing lines. Accordingly, when the first lines are connected to the first switch 411, the sensing resolution decreases, and when the second lines are connected to the second switch 412, the sensing resolution increases. The plurality of first lines 413 include first and second connection portions 413a, 413b. The first and second connection portions 413a, 413b can be selectively connected to the first and second switches 411 and 412, respectively.

For a touch mode for sensing a touch at the first sensing resolution, the controller connects the first and second lines to the first switch 411 to group the plurality of first lines. For example, in the touch mode, the seven first lines form one touch line. Further, the line portion groups the first lines by the second switch 411, and the line portion further includes a grouping switch 414 for forming each grouping as a single sensing line. When all of the grouping switches 414 are connected, the touch sensing layer 310 can sense a touch input at the lowest sensing resolution.

In addition, the plurality of second lines are also selectively connected by the first and second switches 421, 422. The second line 423 includes first and second connection portions 423a, 423b connected to the first and second switches 421, 422, respectively.

Referring to FIG. 4B, the plurality of second lines grouped by the first and second switches 421, 422 are electrically connected to the circuit board 181 by N connection terminals. One connection terminal includes a preset number of lines. A preset number of lines grouped into one connection terminal are arranged adjacent to each other. In addition, the plurality of first lines are also grouped to form a specific number of terminals.

FIG. 4C is a conceptual view illustrating a control method of the touch sensing layer 310 having a second sensing resolution to acquire fingerprint information. The controller connects the plurality of first and second lines 413, 423 to the second switches 412, 422. The first and second lines 413, 423 connected to the second switches 412, 422 respectively form a sensing line and are connected to the circuit board 181. A connection terminal is formed on each of the first lines to form p connection terminals (Cp) in the fingerprint sensing mode. P connection terminals (Cp) are also formed on each of the second lines. Accordingly, the fingerprint information is sensed at the resolution of p×p.

The number p, which is greater than n, may correspond to a number of each of the first lines and the second lines. In other words, the controller may connect each of the grouped lines to the circuit board to change the sensing resolution. In the fingerprint sensing mode, the controller may connect both the first and second lines to the second switch to control them at the first sensing resolution. In this instance, it is not possible to detect the touch input in the entire region of the touch screen 151, and information of the fingerprint touched in the entire region of the touch screen 151 can be sensed.

In addition, the controller can control the touch sensing layer 310 to release the grouping of specific first and second lines for sensing a region to which the touch input is applied. In other words, the controller can control the first and second lines corresponding to the one-touch point to be connected to the second switch, and the first and second lines of the remaining region to be continuously connected to the first switch. In this instance, fingerprint information can be acquired at the one touch point and a touch input may be sensed in the remaining region.

Figure 4D:
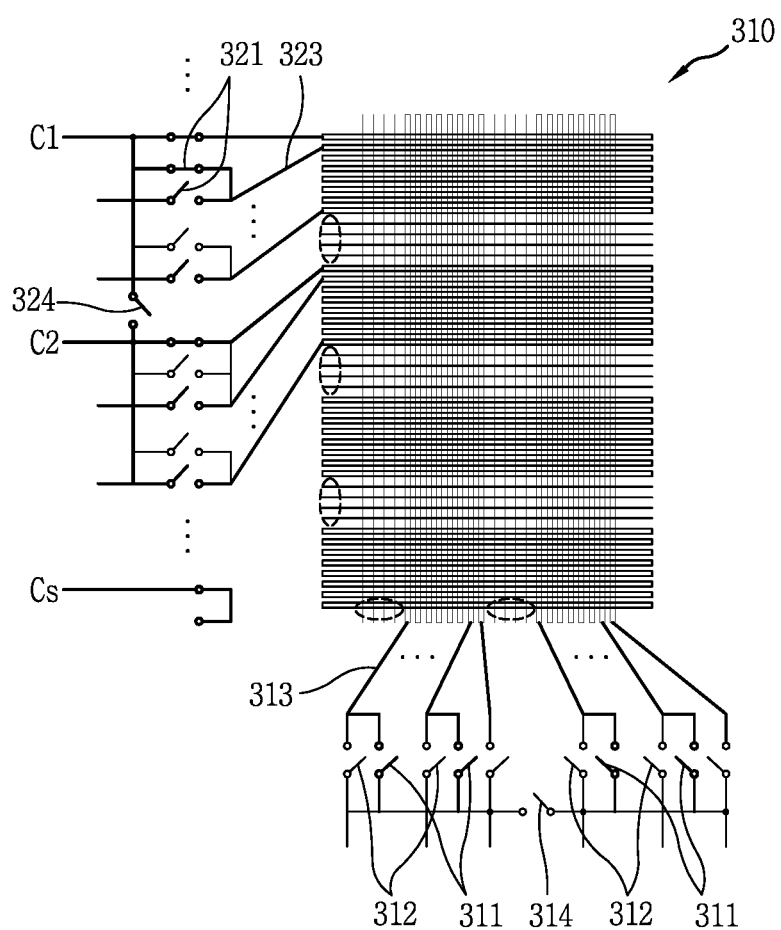
FIG. 4D is a conceptual view illustrating a control method of changing a sensing resolution when a stylus pen is touched on the touch screen.

FIG. 4D is a conceptual view illustrating a control method of changing a sensing resolution when a stylus pen is touched on the touch screen. Referring to FIG. 4D, the grouping switches 414, 424 are short-circuited. Accordingly, a number of lines to be grouped is reduced in the fingerprint sensing mode. In a pen touch mode in which the stylus pen is touched to the touch screen 151, the touch sensing layer 310 has a third sensing resolution lower than the first sensing resolution and higher than the second sensing resolution.

The controller can control the touch sensing layer 310 to sense a touch in one of the first through third sensing resolutions based on a touch region applied to the touch screen 151 and/or a pressure sensed by the pressure sensor unit. Alternatively, the controller may change the sensing resolution of the touch sensing layer 310 when a specific function is performed based on a touch applied to one region of screen information displayed on the touch screen 151.

According to the present disclosure, since the resolution of each region of the touch sensing layer 310 can be changed, the configuration of a separate fingerprint sensing unit is not required. Furthermore, since the acquisition of fingerprint information is allowed in any region on the touch screen 151, fingerprint information can be acquired without any restriction on the position of the touch screen 151. Accordingly, it is possible to implement various functions using a touch input and fingerprint information.

Figure 5A:
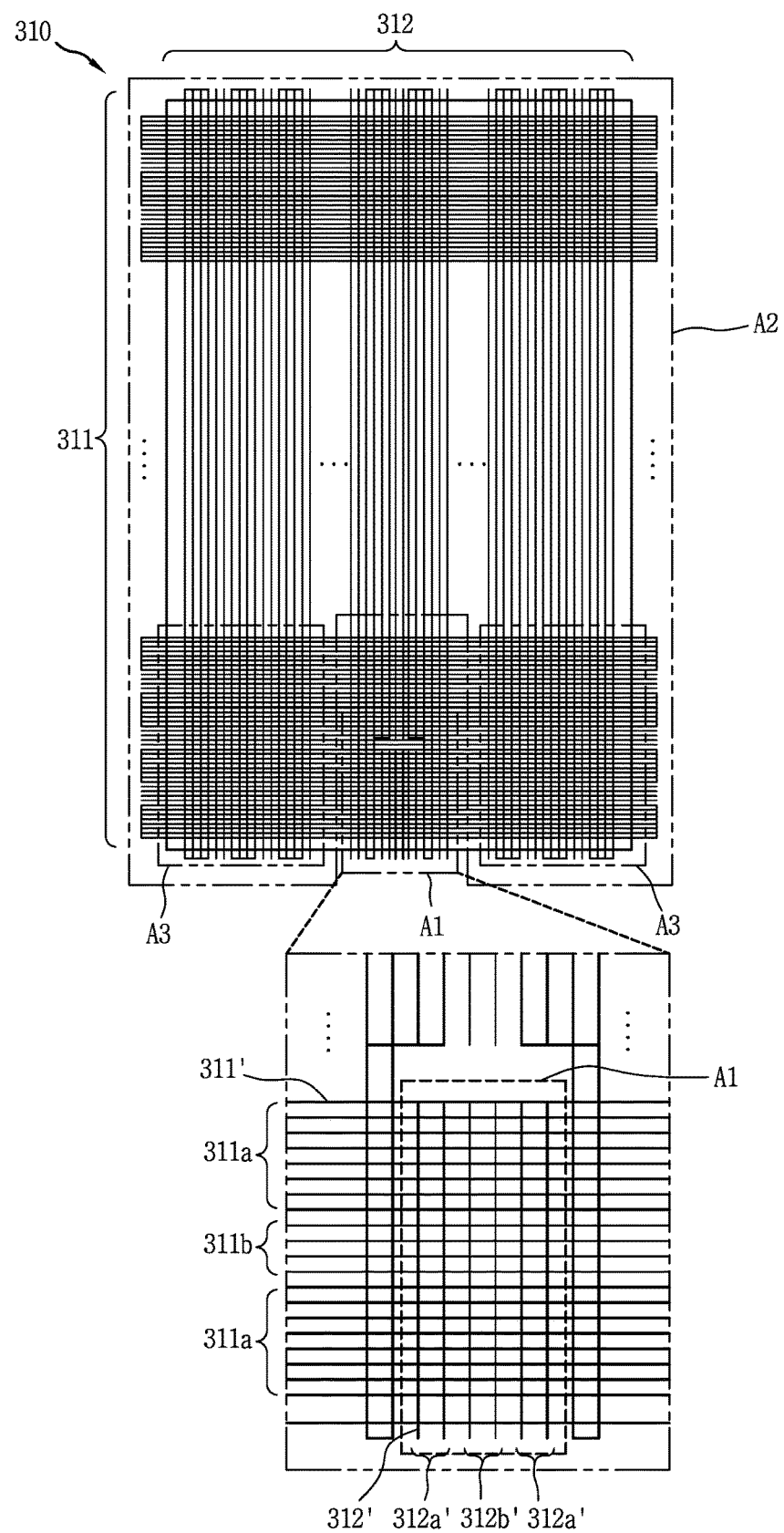
FIGS. 5A through 5C are conceptual views illustrating a control method of changing a sensing resolution of a touch sensing module.
Figure 5B:
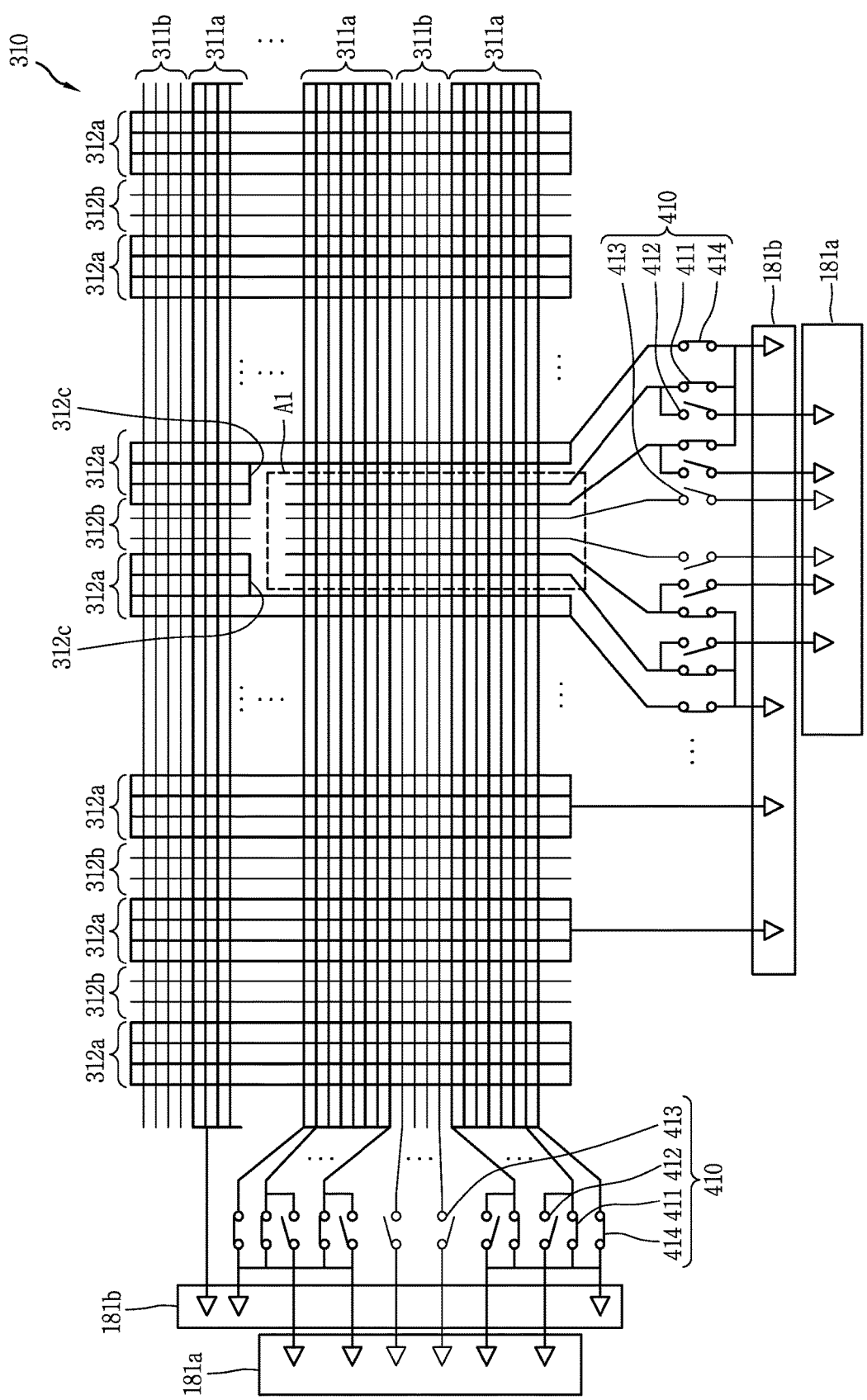
Figure 5C:
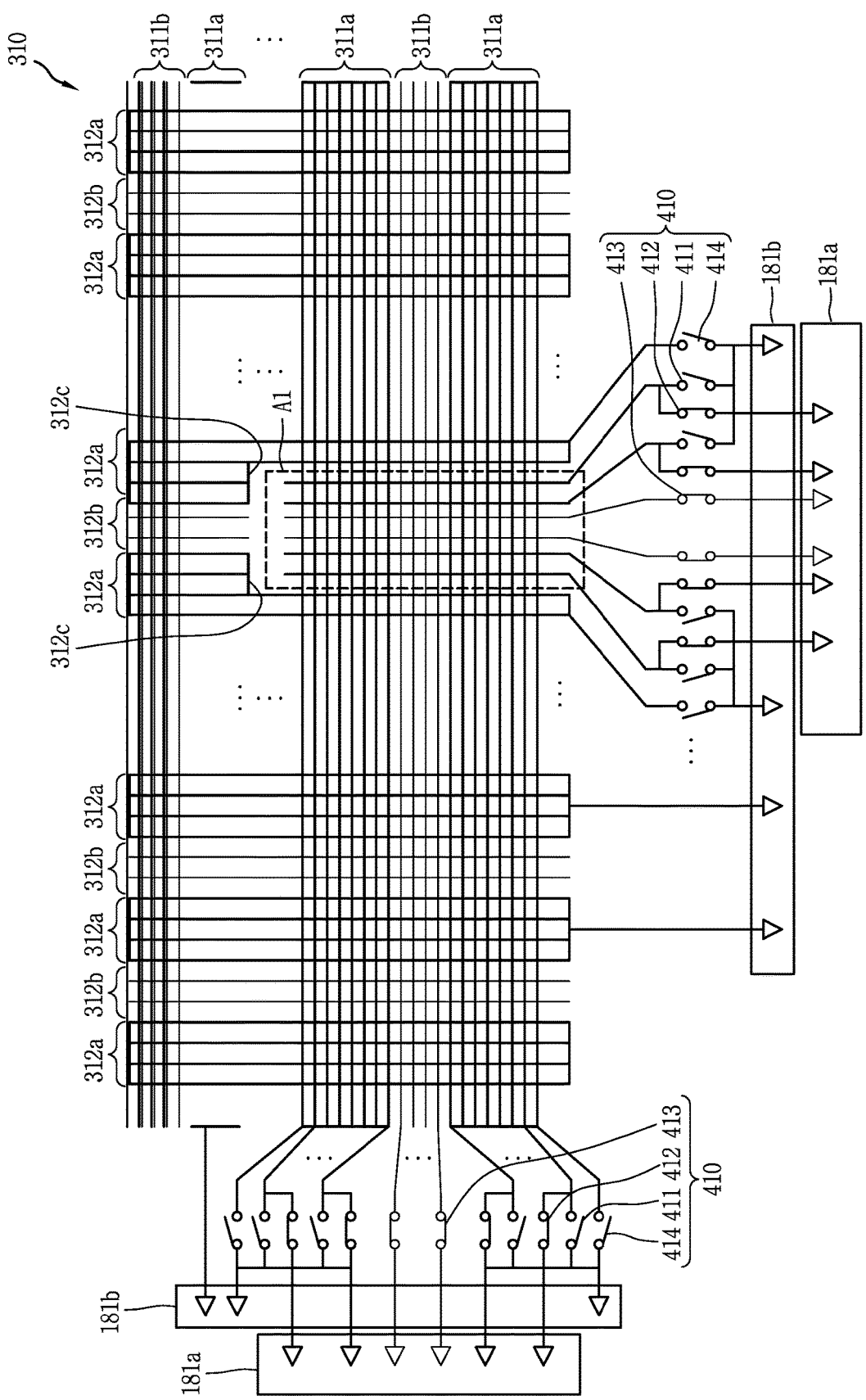

Next, FIGS. 5A through 5C are conceptual views illustrating a control method of changing a sensing resolution of a touch sensing module. Referring to FIG. 5A, the touch sensing layer 310 includes a first sensing layer 311 formed of first lines (Rx) extended in a first direction and a second sensing layer 312 formed of second lines (Tx) extended in a second direction intersecting the first direction. The first and second lines are extended in directions intersecting each other and formed in an insulated state. The first and second sensing layers 311, 312 include a plurality of first and second lines arranged at specific intervals so as to sense a touch at the second sensing resolution.

The touch sensing layer 310 can be divided into first and second regions (A1, A2) and the first region can receive a touch input due to a finger touched on the window 151a or acquire the fingerprint information of the finger. However, the second region of the touch sensing layer 310 can receive the touch input, but does not acquire the fingerprint information.

The first sensing layer 311 includes a first sensing line portion 311a and a first dummy line portion 311b, and the second sensing layer 312 also includes a second sensing line portion 312a and a second a dummy line portion 312b. Each of the first and second sensing line portions 311a and 312a and the first and second dummy line portions 311b, 312b includes a preset number of lines and each line is substantially the same.

A plurality of lines included in each of the first and second sensing line portions 311a, 312a in the second region (A2) are electrically connected to each other to form a single sensing line. The plurality of first and second sensing line portions 311a, 312a are electrically connected to the circuit board, and the plurality of first and second dummy line units 311b, 312b are not electrically connected to the circuit board. In other words, the first and second dummy line units 311b, 312b do not sense a touch input.

Accordingly, the second region (A2) senses the touch input at the first sensing resolution by the first and second sensing line portions 311a, 312a. The first and second dummy line portions 311b, 312b are unable to sense a touch input because no current flows and no change in capacitance is sensed. Accordingly, the second region (A2) does not detect fingerprint information.

Further, in the first region (A1), the first and second sensing line portions 311a, 312a and the first and second dummy line portions 311b, 312b are arranged to intersect with each other. The lines 311' of the first and second sensing line portions 311a, 312a and the lines 312' of the first and second dummy line portions 311b, 312b, which are arranged in the first region (A1), are selectively connected to the circuit board to sense a touch input or fingerprint at the first sensing resolution or the second sensing resolution.

An operation method of allowing a plurality of lines included in the first and second sensing line portions 311a, 312a and the first and second dummy line portions 311b, 312b to be selectively connected to the circuit board so as to sense a touch or acquire fingerprint information will be described with reference to FIGS. 5B and 5C.

FIG. 5B is a conceptual view illustrating an operation state of a plurality of sensing lines for receiving a touch input. Referring to FIG. 5B, a switch 410 is connected to the touch sensing layer 310 to connect lines included in the first region (A1) of the touch sensing layer 310 to the first and second circuit boards 181a, 182b. Each of the first and second sensing line portions 311a, 312a included in the second region (A2) is electrically connected to a second circuit board 181b that senses the touch sensor by a single sensing line. The first and second dummy line portions 311b, 312b included only in the second region (A2) are not electrically connected to the circuit board.

The second sensing line portion 312a of the second region (A2) adjacent to the first region (A1) is short-circuited to the second sensing line portion 312a of the first region (A1), and the second sensing line portions 312a of the second region (A2) are electrically connected to each other. A plurality of lines of the second sensing line portion 312a of the second region (A2) short-circuited with the first region (A1) are electrically connected by a connection line 312c. The plurality of lines of the second sensing line portion 312a electrically connected by the connection line 312c may be connected to the second circuit board 181b by a single sensing line.

The plurality of lines of the sensing line portions 311a, 312a included in the first region (A1) are connected to the first and second switches 411, 412, respectively. One of the first and second switches 411, 412 is selectively connected or short-circuited. The plurality of lines are connected to the first circuit board 181a or the second circuit board 181b by the first or second switch 411, 412, respectively.

The second sensing line portion 312a of the second region (A2) adjacent to the first region is connected to the third switch 413 to connect the second sensing line portion 312a to the second circuit substrate 181b. The third switch 413 connects the second sensing line portion 312a to the second circuit board 181b in a touch receiving mode for sensing the touch input at the first sensing resolution.

Further, in the touch receiving mode, the first switch 411 connects the first and second lines included in the first and second sensing line portions 311a, 312a to the second circuit board 181b. A plurality of lines included in the first and second sensing line portions 311a, 312a connected to the first switch 411 are grouped into a single sensing line and electrically connected to the second circuit board 181b. Part of the second sensing line portion 312a included in the first region (A1) is connected to part of the second sensing line part 312a included in the second region (A2) to form a single sensing line. For example, a plurality of lines connected by the first switch 411 in the first region (A1) may be connected to a line connected by the third switch 413 in the second region (A2), and connected to the second circuit board 181b by a single sensing line.

In this instance, the second switch 412 is short-circuited in the touch receiving mode. Accordingly, in order to receive a touch input, a plurality of sensing lines including a plurality of first and second lines are arranged at intervals of a region formed by the dummy line portions 311b, 312b. The plurality of sensing lines including the first and second sensing line portions 312a, 312b can sense the touch input at the first sensing resolution based on an interval formed by the dummy line portions 311b, 312b.

Referring to FIG. 5C, the operation state of a touch sensing layer when acquiring fingerprint information at a second sensing resolution higher than the first sensing resolution will be described. A plurality of lines included in the first region (A1) are all connected to the first circuit board 181a as sensing lines, respectively. In other words, the plurality of first and second lines included in the first and second sensing line portions 311a, 312a are directly connected to the first circuit board 181a by the second switch 412. In this instance, the first switch 411 is short-circuited.

A plurality of first and second lines included in the first and second dummy line portions 311b, 312b are connected to a fourth switch 414, and in the fingerprint sensing mode, the fourth switch 414 connects each of the first and second lines to the first circuit board 181a. In the touch receiving mode, the fourth switch 414 short-circuits the connection of the first and second lines. In addition, the controller may group a plurality of lines included in the second region (A2) by the first switch 411 to form a sensing line for sensing the touch input at the first sensing resolution.

Referring again to FIG. 5A, a third region (A3) including first lines passing through the first region (A1) may be formed. The controller may connect the first switch 411 to the second line 312' while acquiring fingerprint information at the second sensing resolution in the first region (A1) in the fingerprint sensing mode. However, in this instance, the controller ignores a touch input applied to the third region (A3). Alternatively, the controller 180 can control the remaining lines other than the first and second lines included in the first region (A1) to be short-circuited.

According to the present embodiment, a plurality of lines arranged to have a second sensing resolution can be grouped to control a touch input to be sensed at a first sensing resolution, and fingerprint information can be acquired at a second resolution through a plurality of lines arranged in a specific region (first region). Accordingly, a touch input and fingerprint information can be acquired through a single touch sensing layer including a plurality of lines, and thus an additional fingerprint sensor layer is not required.

Figure 7A:
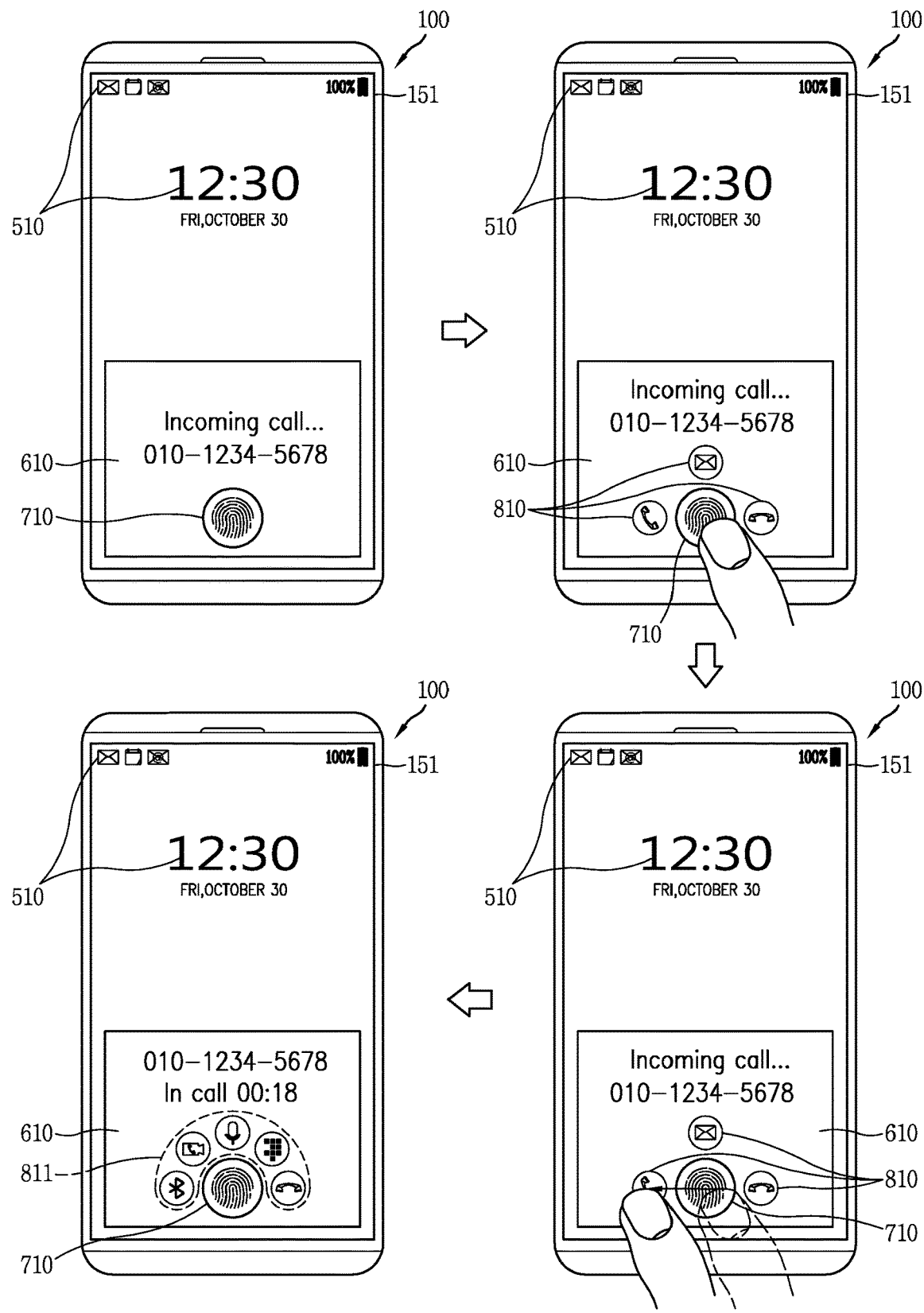
FIGS. 7A through 7C are conceptual views illustrating a control method of an electronic device according to various embodiments.
Figure 7B:
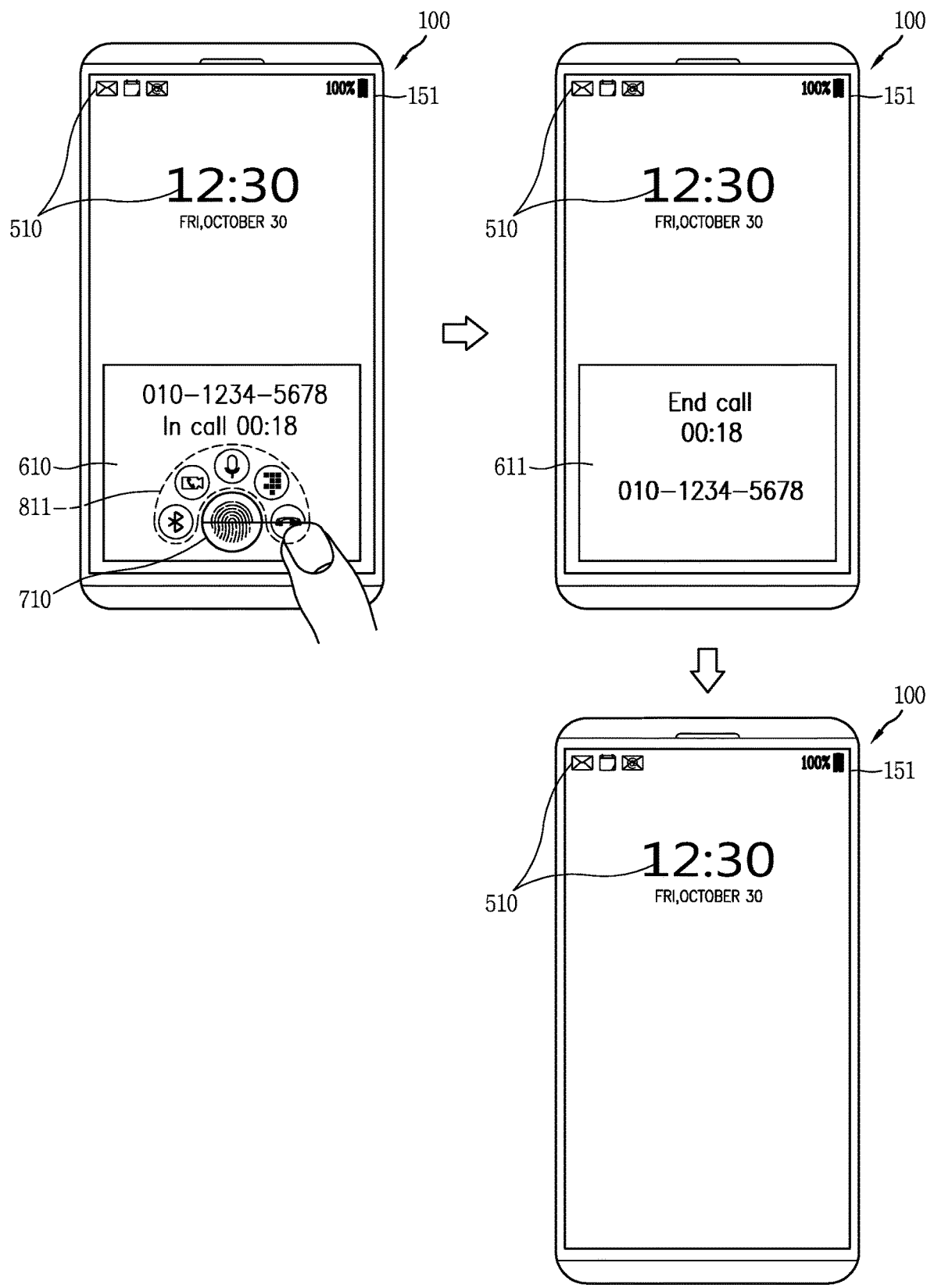
Figure 7C:
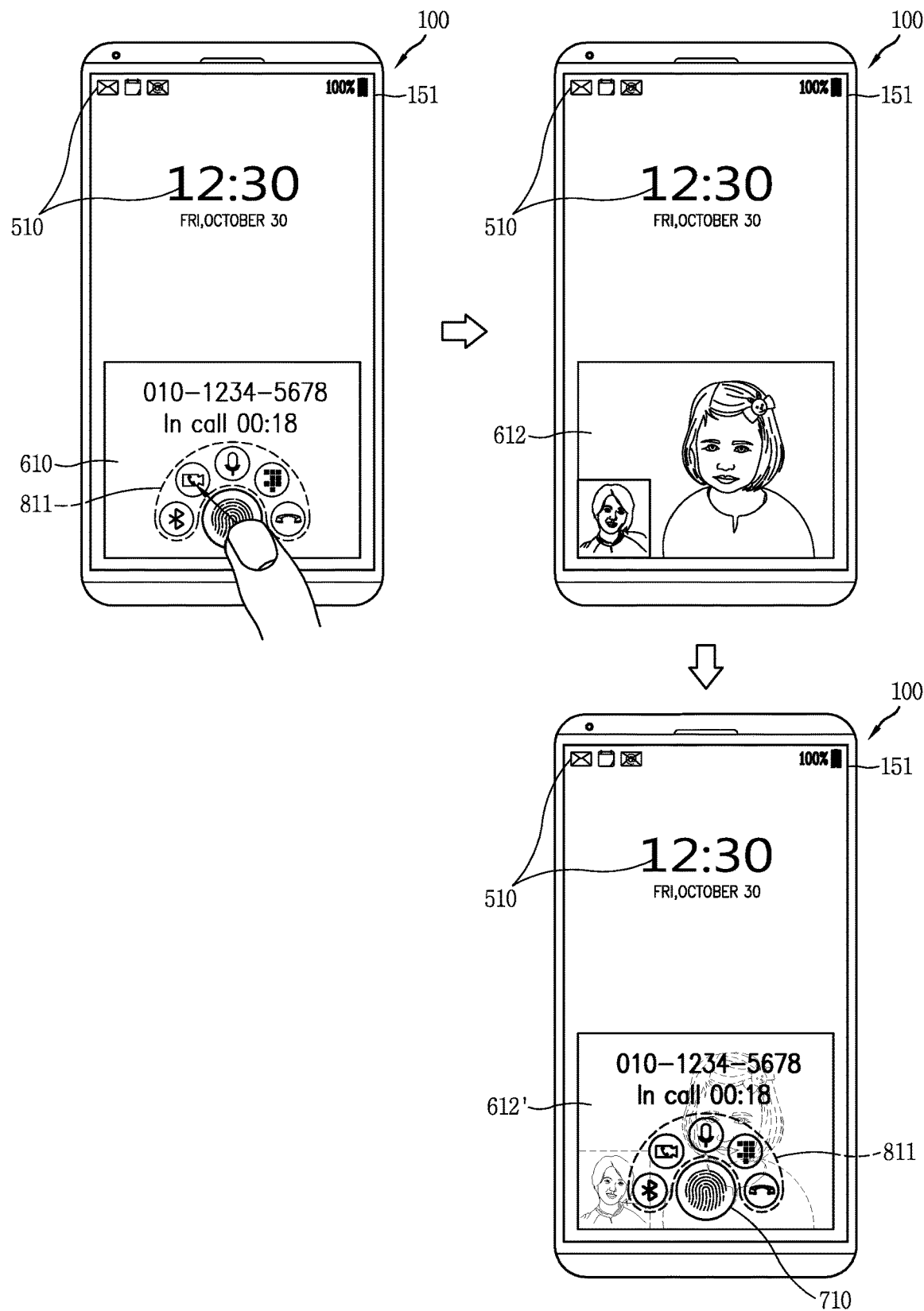

FIG. 6 is a flowchart illustrating a method of controlling a mobile terminal according to an embodiment of the present disclosure, and FIGS. 7A through 7C are conceptual views illustrating a control method of an electronic device according to various embodiments.

When a specific control command is applied, the controller 180 controls the touch screen 151 to display a fingerprint image 710 to a specific region (S11). Also, referring to FIG. 7A, the display unit 151 can display a standby image (Always On Display (AOD)) 510 when the entire display is not activated. The standby image 510 can include operation state information such as a current time, date, and the like, information associated with the generated event (e.g., an icon, etc.), a remaining battery, and the like. However, the standby image 510 can be controlled not to be displayed based on the setting of the user. The control method according to the present embodiment is implemented substantially the same even in an inactive state in which power is off not to display the standby image.

The controller 180 displays a notification screen 610 in one region of the touch screen 151 when a specific event occurs. The touch screen 151 on which the notification screen 610 is displayed receives a touch input for controlling a function related to the specific event. The specific event may correspond to a call receiving event. When a call is received, information on an external device that has originated the call and a graphic image for controlling a call function can be displayed.

The fingerprint image 710 is displayed in a specific region of the touch screen 151 based on the occurrence of the specific event. Here, the specific region may correspond to a specific region on the touch screen on which the fingerprint sensing unit is formed, or may correspond to one region included in the notification screen 610 when fingerprint sensing is allowed in the entire region of the touch screen 151 Further, the notification screen 610 can be displayed along with the standby image 510 at a lower end of the touch screen 151. In other words, when the call is received, the touch screen 151 displays the fingerprint image 710 together with the notification screen 610.

In addition, the controller 180 controls one region of the touch screen 151 displayed with the fingerprint image 710 to sense a fingerprint at the second sensing resolution while displaying the fingerprint image 710. The touch screen 151 senses a fingerprint at the second sensing resolution by a touch applied to the fingerprint image 710 (S12).

The controller 180 can also perform an authentication process using a fingerprint sensed by the touch screen 151. For example, the controller 180 can perform an authentication procedure by comparison with fingerprint information previously stored in the memory. In addition, the controller 180 controls the touch screen 151 to display at least one function icon 810 adjacent to the fingerprint image 710 based on a result of the authentication procedure (S13).

Here, the function icon 810 receives a touch input to control an application associated with the notification screen 810. For example, a plurality of function icons 810 can be arranged to surround the fingerprint image 710, but the arrangement form of the function icons 810 is not limited to the illustration of the drawings. In addition, when the authentication fails, that is, when the fingerprint information of the designated user is different from the sensed fingerprint, the controller 180 controls the touch screen 151 to display a function icon for performing a different function.

When an authentication procedure is performed based on the sensed fingerprint, function icons 810 for performing functions such as connecting a received call, transmitting text, blocking call reception, or the like can be displayed. Alternatively, when the authentication fails, icons for performing functions such as transmitting a message related to the absence of a user, limiting the display of a notification sound for notifying call reception, or the like can be displayed adjacent to the fingerprint image 710.

The controller 180 senses a fingerprint by a touch applied to the fingerprint image 710 and performs a first function corresponding to the function icon 810 based on a touch input applied to the function icon 810. In this instance, the function can be performed by a continuous dragging type of touch input in which a touch initially applied to the fingerprint image 710 is moved and released from the function icon 810.

When a function corresponding to the function icon 810 is executed, execution information can be displayed on the notification screen 610. When a call is connected, the notification screen 610 may include call connection information, connection time, information of connected external devices, and the like. In addition, the notification screen 610 can display an additional function icon 811 for an additional function adjacent to the fingerprint image 710 while the call is connected.

Even in this instance, the touch screen 151 can sense a fingerprint at the second sensing resolution by a touch initially applied to the fingerprint image 710, and then detect a touch input to the additional function icon 811. Alternatively, the controller 180 can control the fingerprint image 710 to disappear after the function is executed by the sensed fingerprint.

Referring to FIG. 7B, a second function is executed based on a touch applied to the additional function icon 811, and an execution screen 611 indicating the second function is displayed. For example, the second function may correspond to disconnecting a connected call. While the function is being executed, the remaining region of the touch screen 151 excluding the notification screen 810 does not receive a touch input, and does not display other images. In other words, when the execution of a function related to the event is terminated, the notification screen 810 disappears, and the entire region of the touch screen 151 is switched to an inactive state.

According to the present embodiment, when an event is received, a function can be controlled without activating the entire region of the touch screen 151, and thus when it is not required to display screen information on the entire region of the touch screen 151, only one region of the screen can be activated to minimize power consumption. Also, a fingerprint image can be displayed to easily perform an authentication procedure using a fingerprint, and icons can be displayed adjacent to the fingerprint image to conveniently perform its related functions after the authentication is completed.

A control method of executing an additional function will be described with reference to FIG. 7C. After a specific function associated with an event that has occurred through fingerprint authentication is executed, the touch screen 151 displays an additional function icon 811 associated with the event adjacent to the fingerprint image 710. The controller 180 can control another function associated with the executed function based on the touch input applied to the additional function icon 811. The touch screen 151 displays an execution image for the another function on the notification screen 610.

Referring to FIG. 7C, when a third function is executed based on a touch applied to the additional function icon 811, an execution screen 612 based on the third function is displayed in one region of the touch screen 151. For example, the third function may correspond to a video call function, and an image captured by the camera 121 activated according to the activation of the third function and a received video image are displayed on the execution screen 612.

The size and display position of the execution screen 612 may be substantially the same as the notification screen 610. In addition, a modified execution screen 612' overlapping with the additional function icon 811 can be displayed. The modified execution screen 612' may be adjusted in sharpness, luminance, and the like to display the additional function icon 811.

Figure 8A:
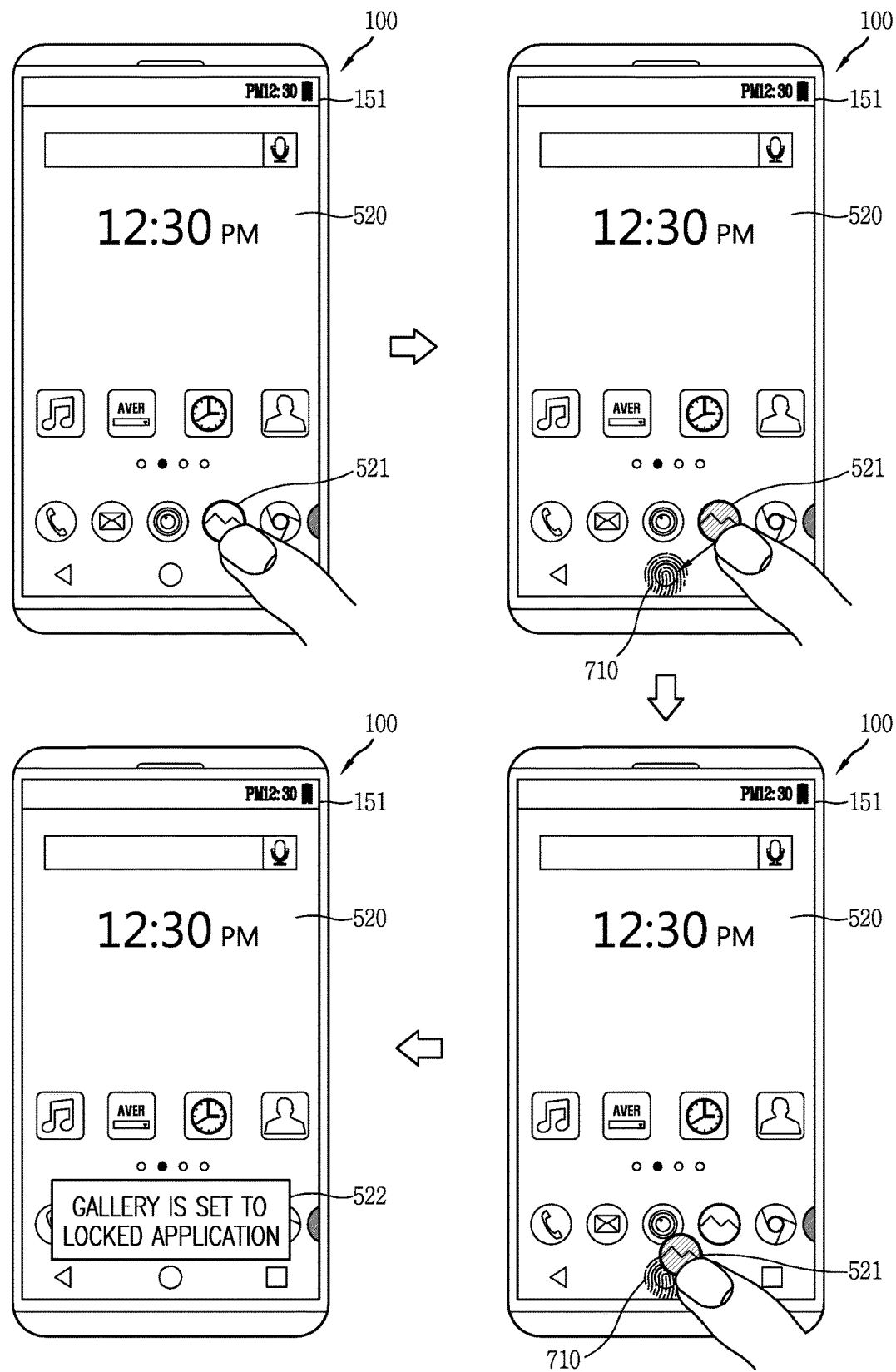
FIGS. 8A through 8F are conceptual views illustrating a control method of executing a function through a fingerprint sensed based on a touch applied on screen information.

Next, FIGS. 8A through 8F are conceptual views illustrating a control method of executing a function through a fingerprint sensed based on a touch applied on screen information. In particular, FIG. 8A illustrates a touch screen that displays screen information 520 including at least one icon 521 corresponding to applications. The screen information 520 may correspond to a home screen page. When a touch input is applied to the icon 521, a function corresponding to the icon 521 is executed.

Further, when a specific type of touch input (for example, a long press type touch input) is applied to the icon 521, the controller 180 activates an edit mode of the home screen page. In the editing mode, the icon can be deleted, the display position can be moved or an icon can be additionally arranged based on a touch applied to the home screen page.

An editing mode by the specific type of touch input is activated, and a fingerprint image 710 is displayed in a specific region. The controller executes a specific function related to an application of the icon 521 based on a continuous touch input initially applied to the icon 521 and moved to the fingerprint image 710. The controller 180 controls the touch screen to acquire fingerprint information at the second sensing resolution based on the touch applied to the fingerprint image 710. When an authentication procedure is performed according to the sensed fingerprint information, the controller 180 executes the specific function. The execution point of the specific function may correspond to a point of time when the touch is released from the fingerprint image 710. Also, the display position of the icon 521 can be moved according to a touch path of the continuous touch input.

Further, the controller 180 can execute a preset function such as an execution of an application corresponding to the icon 521, a change of setting, and the like. For example, when an authentication procedure based on a fingerprint is performed by touch input applied to the icon 521, a locked state can be set to an application corresponding to the icon 521.

For example, password information for releasing the locked state can correspond to the sensed fingerprint information. Accordingly, in order to set a locked state of the application, it is possible to easily perform a specific function related to the application without complicated steps such as executing the application, changing the setting, and entering lock information.

Figure 8B:
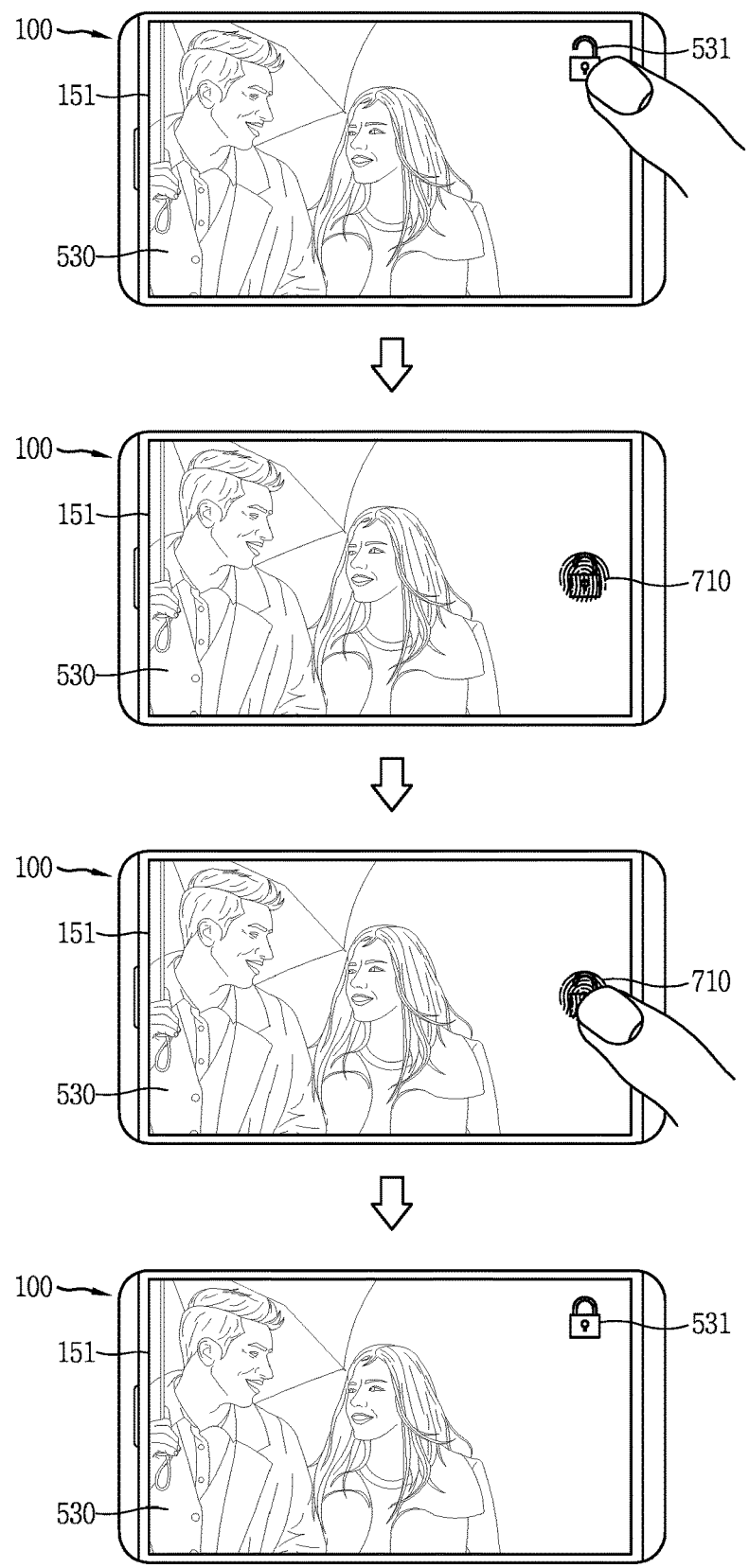

Next, FIG. 8B illustrates a touch screen that displays an execution screen 530 of the executed application. For example, the execution screen may correspond to a video image that changes with time such as a DMB image, a playback image of a video file or the like.

As shown, the execution screen 530 includes a control icon 531 for controlling the image. When a touch input is applied to the control icon 531, the controller displays a fingerprint image 710 in one region on the touch screen 151. Although a region displayed with the control icon 531 and a region displayed with the fingerprint image 710 are shown differently on the drawing, the fingerprint image 710 can be displayed on the control icon 531 based on the touch screen 151 according to the embodiment of FIGS. 4A through 4D. Alternatively, as shown in FIG. 8B, the control icon 531 can be displayed in an overlapping manner on the fingerprint image 710 displayed in the specific region.

The controller 180 controls the touch screen to sense a fingerprint at the second sensing resolution based on a touch applied on the fingerprint image 710, and performs an authentication procedure based on the sensed fingerprint. When the authentication procedure is performed, a function corresponding to the control icon 531 is performed.

For example, it can be switched to a locked state and controlled not to sense a touch input on the touch screen or implemented in a stop state not to switch the image. However, a function corresponding to the control icon 531 is not limited thereto. When authentication is not performed by the sensed fingerprint, the function is not performed, and the fingerprint image 710 may disappear.

Figure 8C:
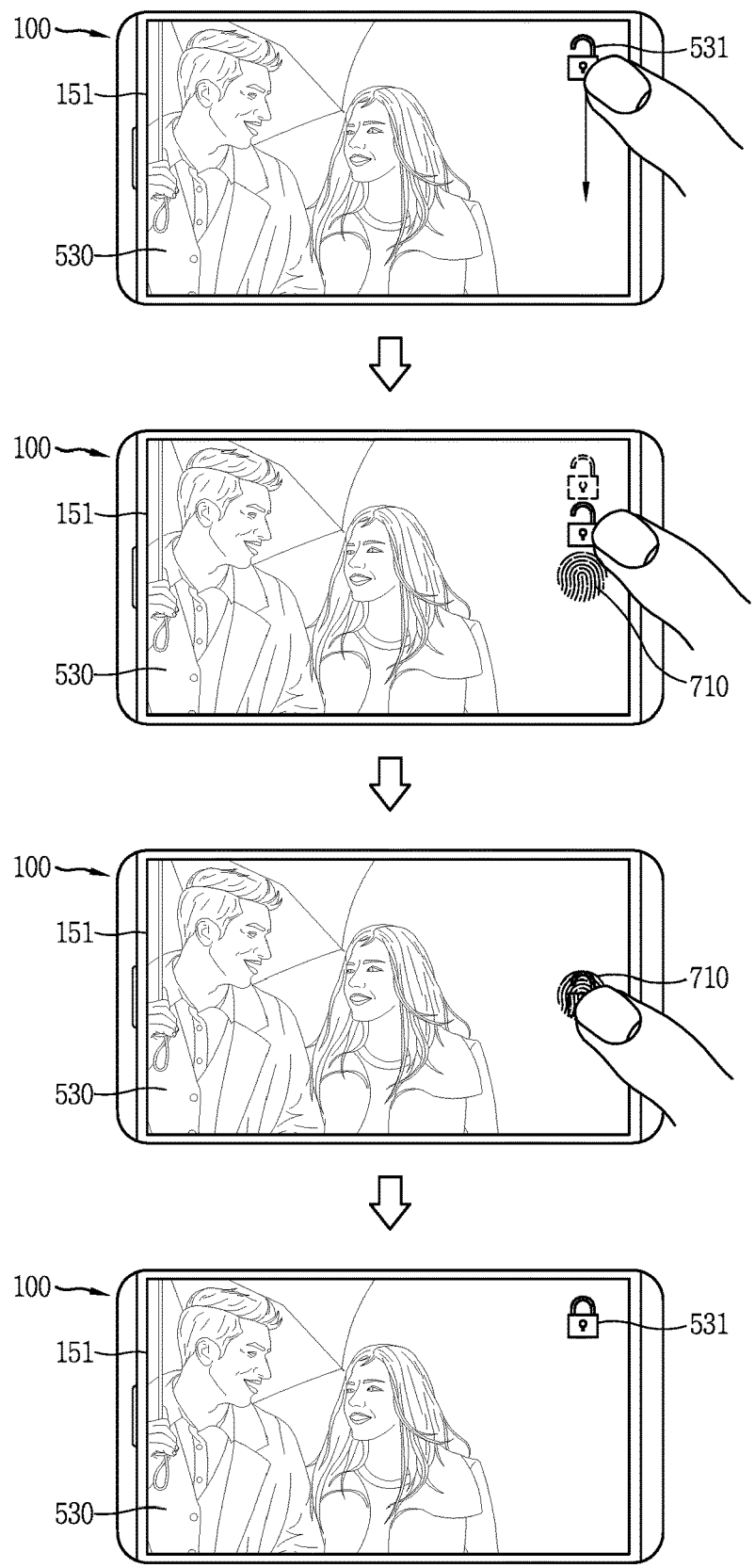

Referring to FIG. 8C, the controller controls the touch screen 151 to display the fingerprint image 710 in a specific region of the touch screen 151 based on a dragging type of touch input applied to the control icon 531. The touch screen senses a fingerprint when a continuous touch input initially applied to the control icon 531 reaches the fingerprint image 710. Further, the display position of the control icon 531 can be changed while the continuous touch input is applied. The controller performs an authentication procedure based on the sensed fingerprint, and executes a preset function.

Further, the control icon 531 can be changed to an image indicating the execution result of the function. The controller can control another function to be executed based on a touch applied to the changed control icon 531.

Figure 8D:
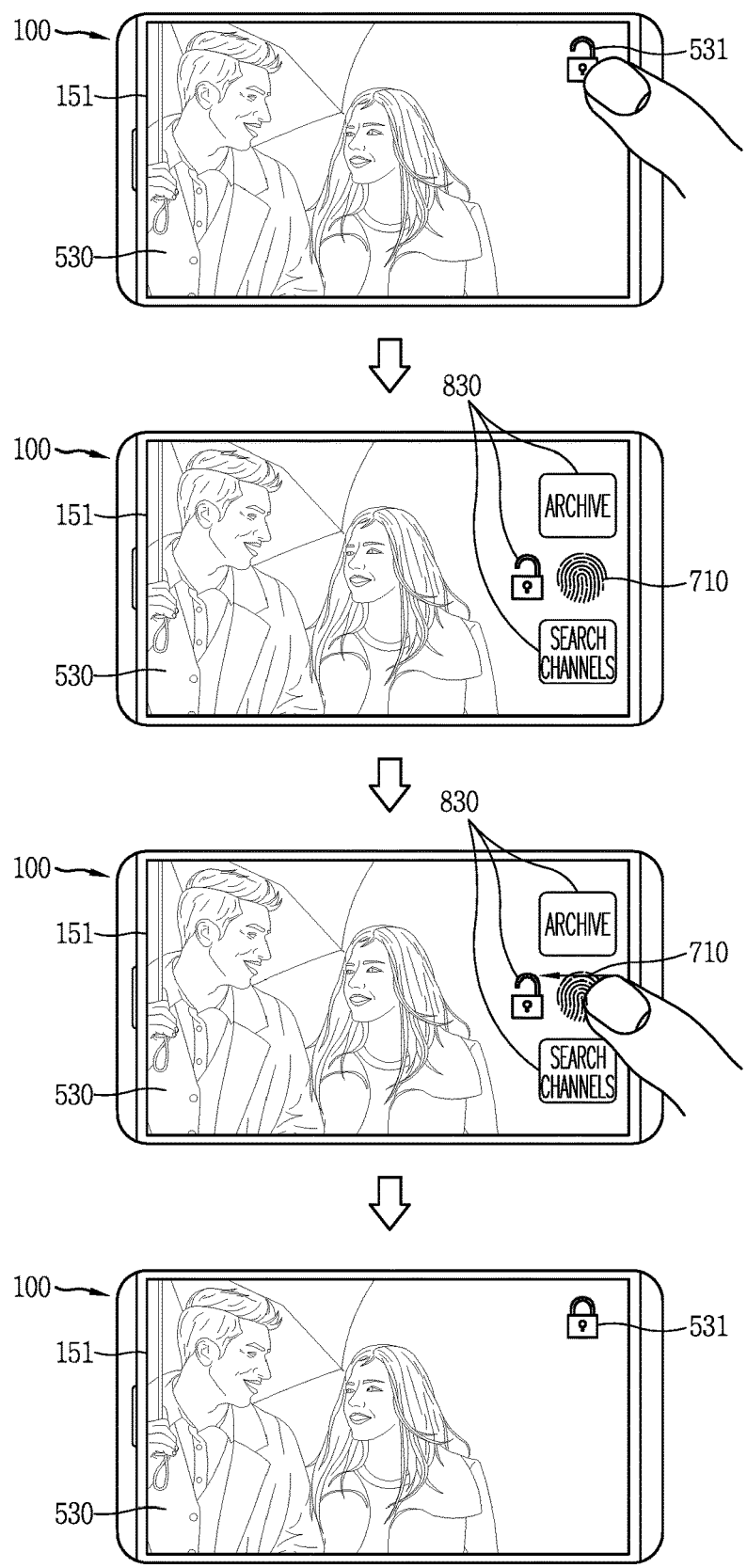

Referring to FIG. 8D, the controller 180 displays the fingerprint image 710 in a specific region of the touch screen based on a touch applied to the control icon 531. Also, at least one function icon 830 is displayed in a region adjacent to the fingerprint image 710, and the control icon 531 is displayed in a region adjacent to the fingerprint image 710.

The controller 180 controls the touch screen to sense a fingerprint at the second sensing resolution when a touch is applied to the fingerprint image 710. A function set to each by the control icon 531 or the function icon 830 selected based on a touch input initially applied and then continuously applied to the fingerprint image 710 is performed. For example, when the control icon 531 corresponds to a function for ignoring a touch applied to the execution screen 530, the function icon 830 disappears when the control icon 531 is selected.

Figure 8E:
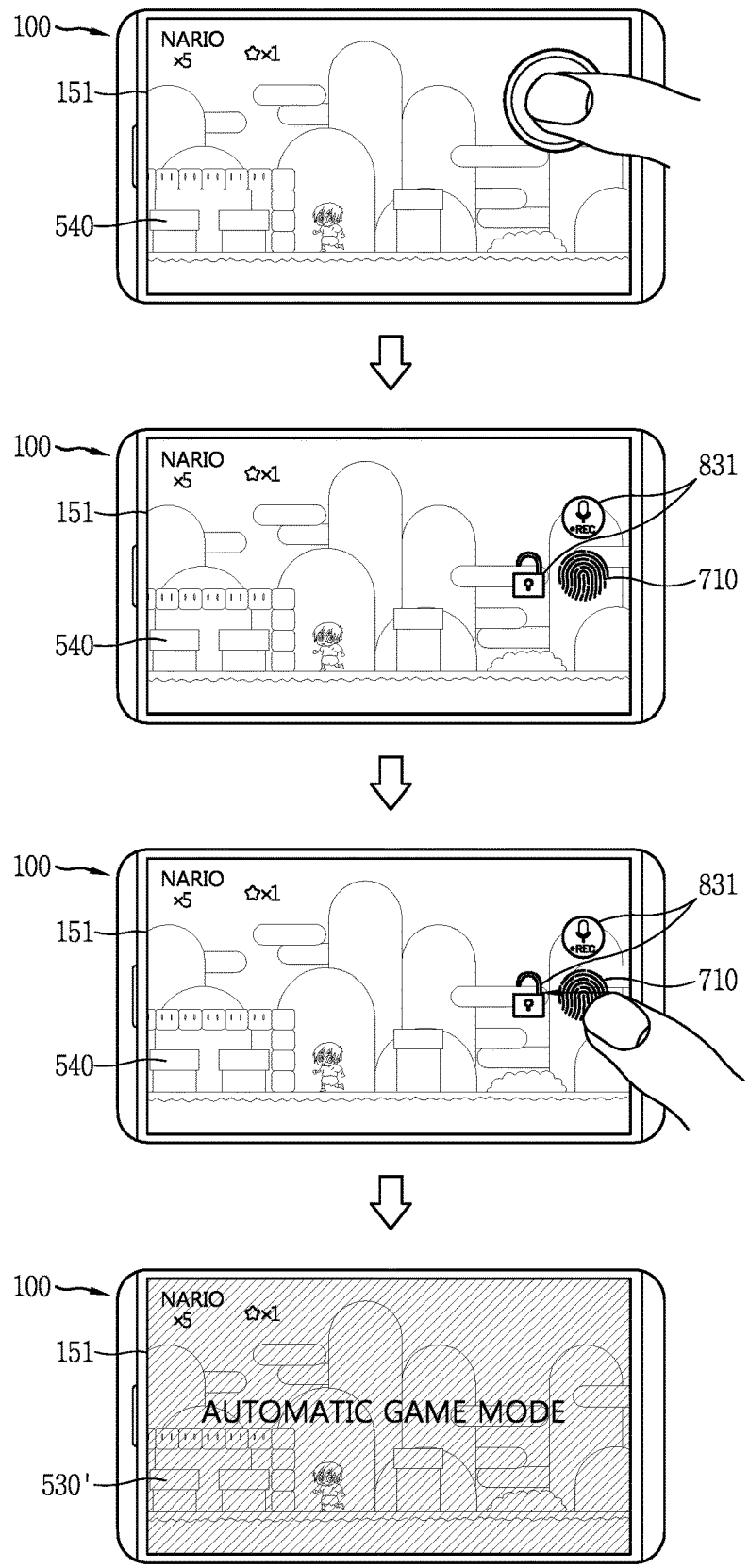

FIG. 8E illustrates a touch screen that displays an execution screen 540 according to another embodiment. For example, the execution screen 540 may correspond to a game execution screen of a game application that is in progress by a touch input. The controller 180 controls the touch screen to display a fingerprint image 710 in a specific region when a specific type of touch input is applied to the execution screen 540. Furthermore, at least one function icon 831 is displayed adjacent to the fingerprint image 710. The function icon 831 corresponds to a specific function or setting of the executed application.

The controller 180 senses a fingerprint at the second sensing resolution, and performs an authentication procedure when a touch is applied to the fingerprint image 710. Further, the function of the application corresponding to the selected function icon 831 is executed based on the fingerprint image 710 and a continuous touch input applied to the function icon 831. For example, the game application may be switched to an automatic game mode to control the game to be driven in a low power screen state. In the automatic game mode, the execution screen is switched to a low-power screen 530' in which the brightness is relatively low.

Further, the function may not be executed when authentication by the fingerprint fails, and the fingerprint image 710 and the function icon 831 may disappear when a touch input is applied to a different region other than the fingerprint image 710. As a result, it is possible to perform a specific function or change settings without stopping the game or deactivating the application while executing a game application.

Figure 8F:
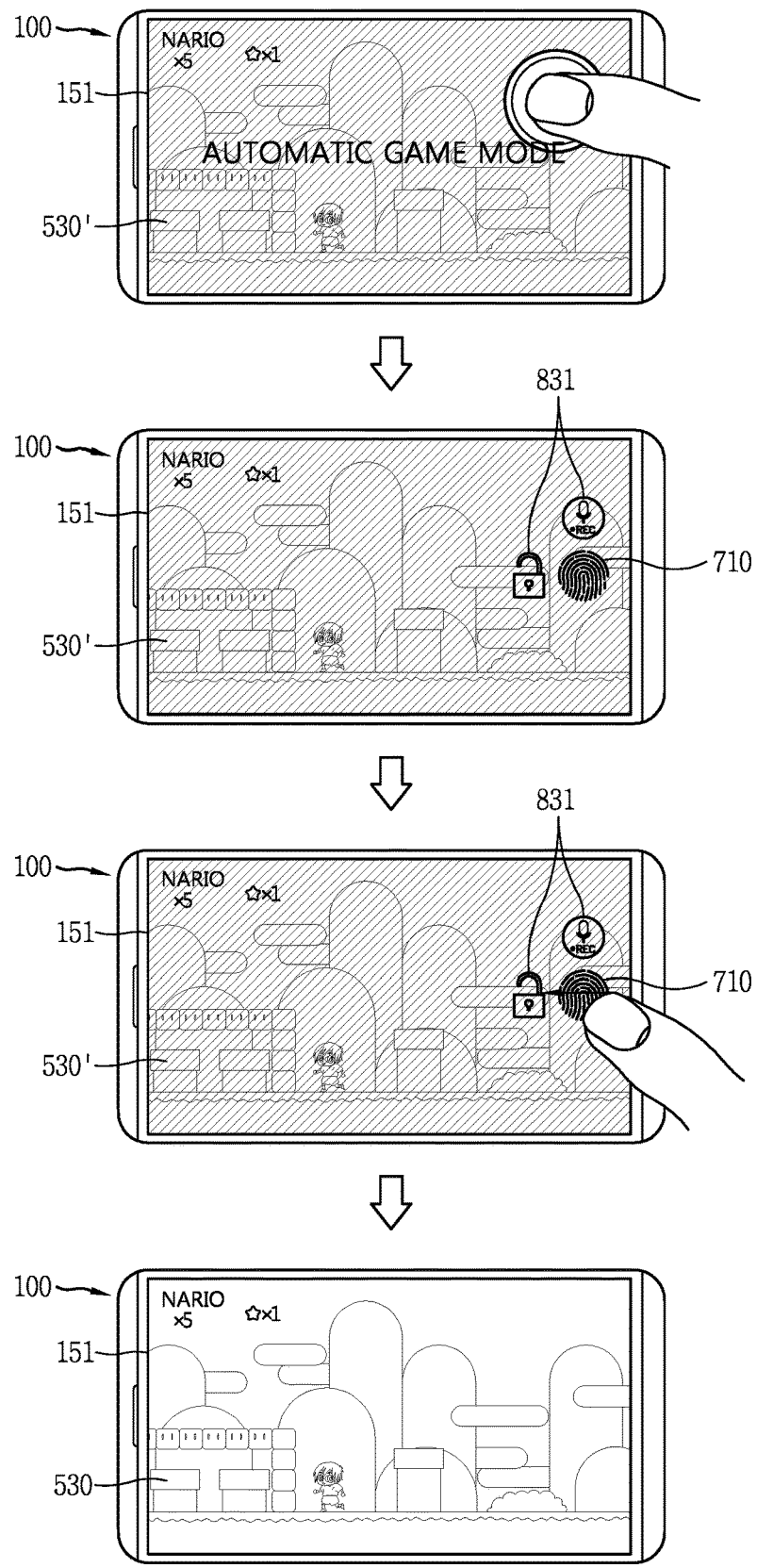

FIG. 8F illustrates when an automatic game mode is activated. As shown, the controller 180 controls the touch screen 151 to display the fingerprint image 710 and the function icon 831 when a specific type of touch input is applied to the touch screen. Here, the function icon 831 may correspond to termination of the automatic game mode.

The touch screen senses a fingerprint based on a touch applied to the fingerprint image 710, and the controller 180 performs an authentication procedure based on the sensed fingerprint, and then displays a function corresponding to the function icon 831 selected by a touch input. In other words, the controller may cancel the automatic game mode when the authentication procedure is performed. Accordingly, the low power screen 530' is switched to the execution screen 530 again.

Figure 9A:
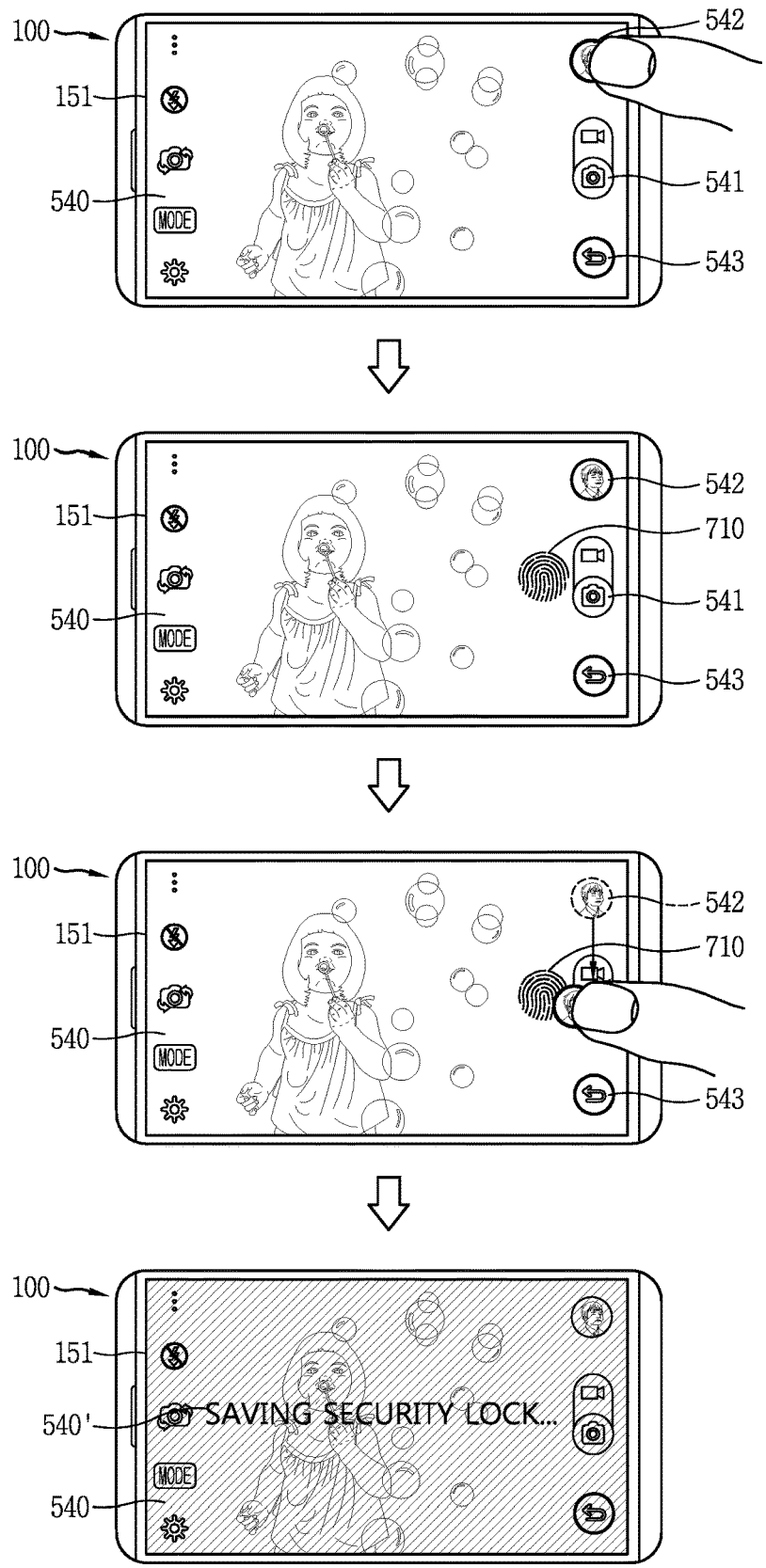
FIGS. 9A and 9B are conceptual views illustrating a control method associated with a camera function.
Figure 9B:
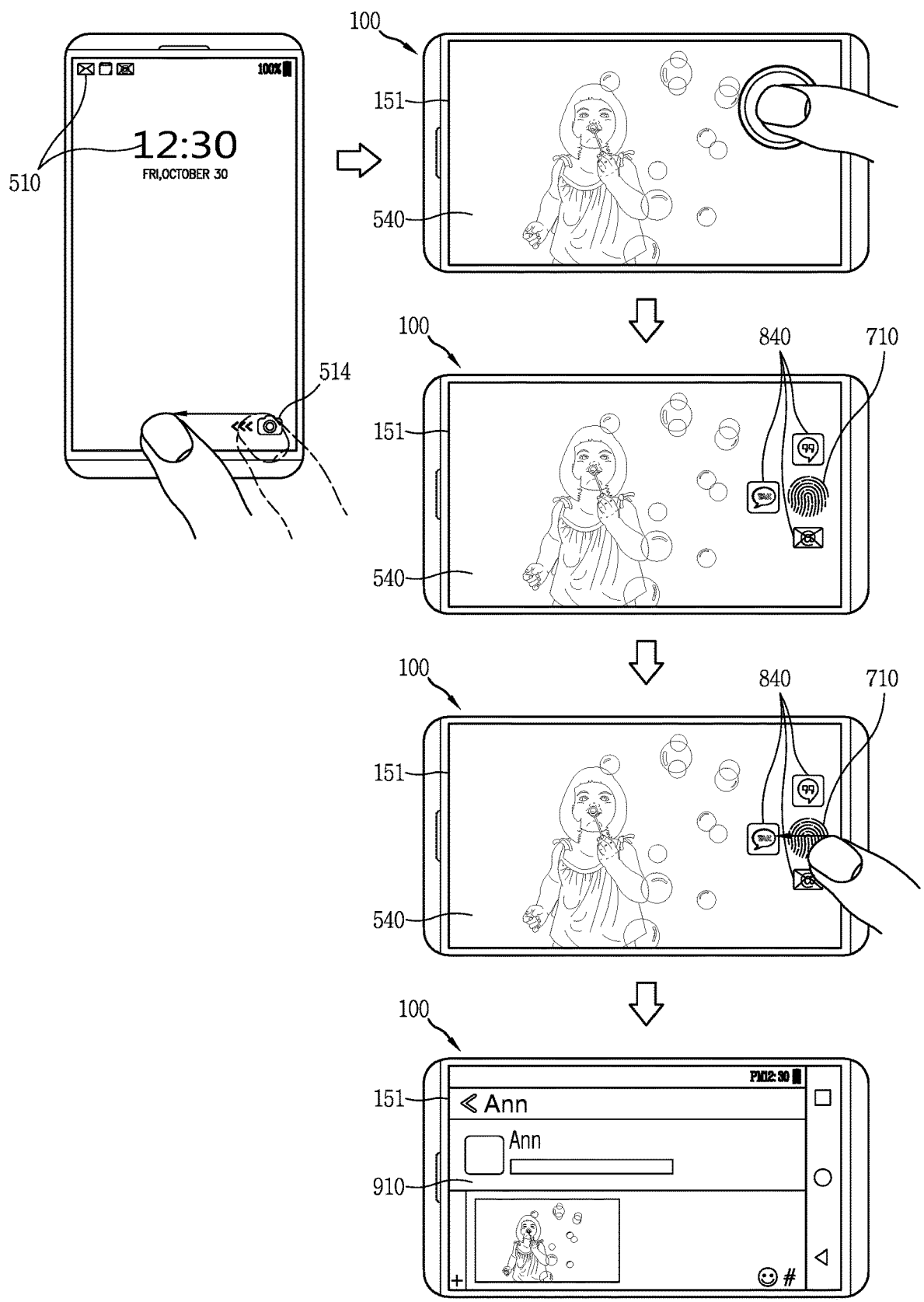

Next, FIGS. 9A and 9B are conceptual views illustrating a control method associated with a camera function. In particular, FIG. 9A illustrates an execution screen of a camera application in a state in which the camera 121 is executed. The touch screen displays a preview image 540 acquired by the camera 121 on an execution screen of a camera application, and first through third control icon 541, 542, 543 for controlling the camera application on the preview image 540 are displayed on the preview image 540. While the camera application is being executed, the controller 180 displays the fingerprint image 710 based on a specific type of touch input applied to the first through third control icons 541, 542, 543.

For example, the first control icon 541 controls capturing of images through the camera 121, the second control icon 542 controls termination of the camera application, and the third control icon 543 receives a touch input to control the display of the captured images. The controller 180 displays the fingerprint image 710 in a region adjacent to the first control icon 543 based on a continuous type of touch input initially applied to the second control icon 542 and applied to the first control icon 543.

The touch screen 151 senses a fingerprint at the second sensing resolution based on a touch applied to the fingerprint image 710. The touch applied to the fingerprint image 710 may correspond to a touch input initially applied to the second control icon 542 and a continuous touch input, but the present disclosure is not limited thereto.

The controller 180 performs a specific function of the camera application based on a fingerprint sensed by a touch applied to the fingerprint image 710. The specific function may be set by the user. For example, the controller 180 controls the camera 121 and the memory 170 to capture an image by the camera 121 and store the captured image in a locked state. The touch screen can display notification information 540' indicating that the captured image is stored in a locked state.

Referring to FIG. 9B, when the electronic device 100 is in a locked state, the touch screen 151 displays a control icon 514 for activating the camera 121 on a lock screen in the locked state. The controller 180 controls the touch screen to activate the camera 121 and display a preview image 540 acquired by the camera 121 based on a touch input applied to the control icon 514.

The touch screen displays a fingerprint image 710 in a specific region based on a specific type of touch input applied to the preview image 540. The controller can control one region of the touch screen to sense a fingerprint at the second sensing resolution while displaying the fingerprint image 710. The touch screen displays a function icon 840 adjacent to the fingerprint image 710.

The function icon 840 may correspond to icons of other applications capable of performing a function in connection with the camera application. For example, the icon may correspond to an icon of applications that performs a specific function using an image captured by the camera 121.

The controller 180 senses a fingerprint based on a touch applied to the fingerprint image 710 to perform an authentication procedure. An application selected by the touch input applied to the function icon 840 may be activated. In addition, the controller 180 controls the camera 121 to capture an image based on a touch applied to the fingerprint image 710.

The controller 180 executes a function of the application using the captured image, and controls the touch screen to display an execution screen 910. For example, it may correspond to an execution screen for sending the captured image to an external device or uploading the captured image to a specific server.

However, when authentication is not performed by a fingerprint applied to the fingerprint image 710, the application is not executed. In other words, the locked state is not released by the fingerprint. In this instance, the controller 180 can control the camera 121 to capture an image, and display warning information indicating that the execution of the application is not allowed. Accordingly, the user can execute the function of the application using the captured image through fingerprint authentication even in a locked state.

Figure 10A:
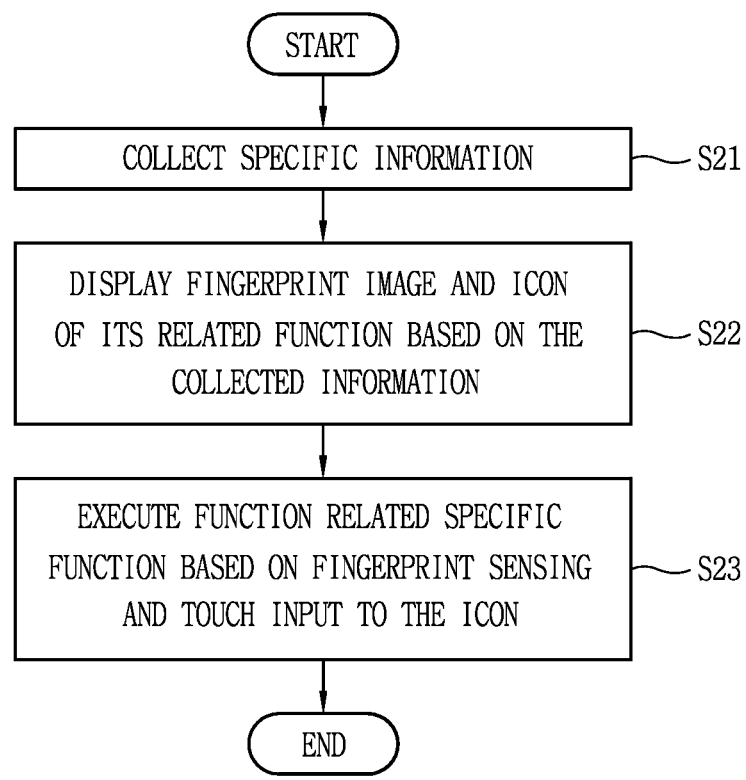
FIG. 10A is a flowchart illustrating a control method of recommending a function associated with information collected by an electronic device.
Figure 10B:
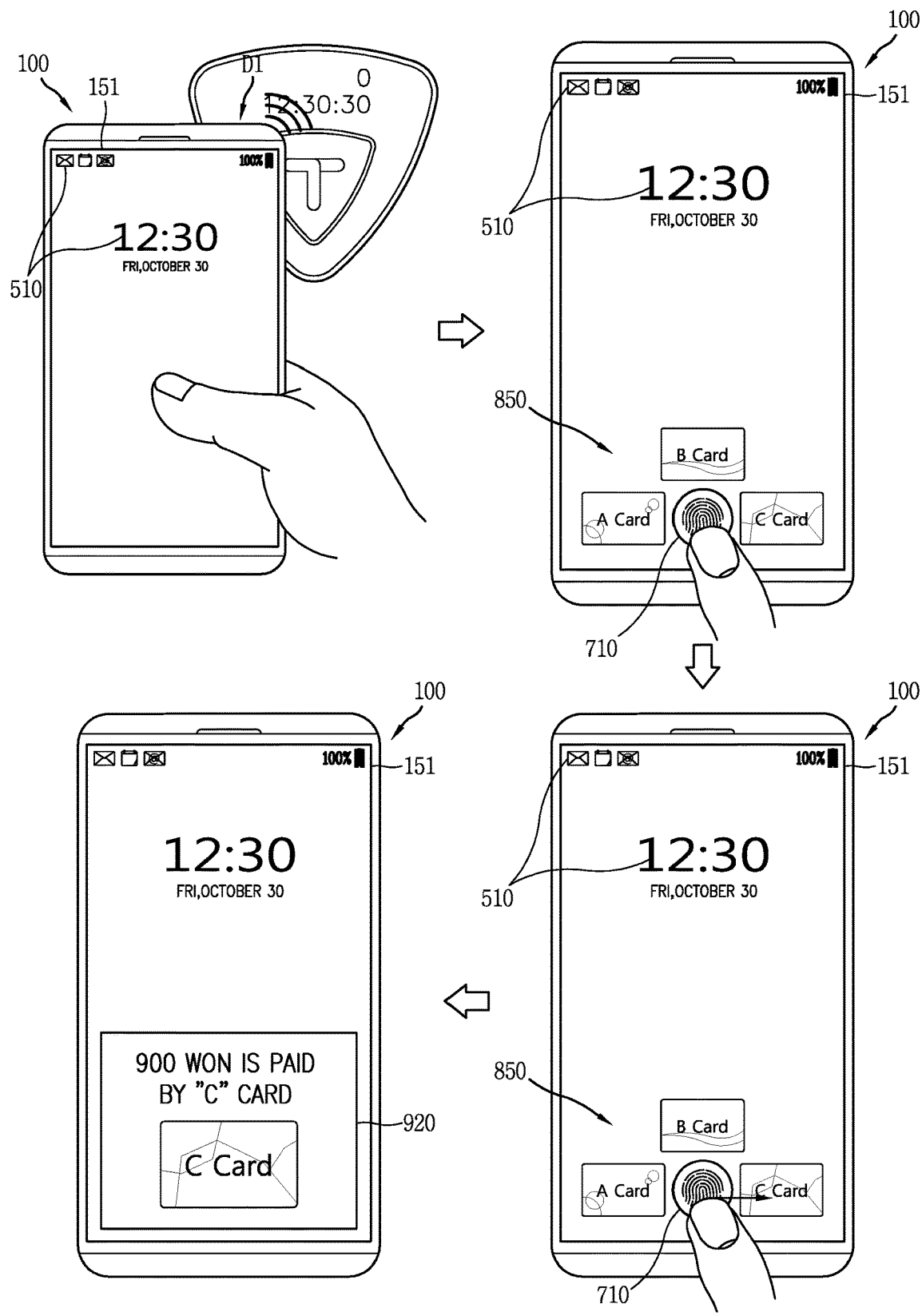
FIGS. 10B through 10E are conceptual views illustrating a control method of according to various embodiments.

Next, FIG. 10A is a flowchart illustrating a control method of recommending a function associated with information collected by a mobile terminal, and FIGS. 10B through 10E are conceptual views illustrating a control method of according to various embodiments. Referring to FIGS. 10A and 10B, the electronic device 100 collects specific information (S21). Here, the specific information can be collected by various sensors, and the like, and may correspond to information on date, time, location, received information (signal), a prestored schedule, a linked external device, and the like.

The controller 180 displays a fingerprint image and a function icon related thereto icon based on the collected information (S22). Furthermore, a function related to the specific information is executed based on the fingerprint image and the touch input applied to the function icon (S23).

For example, when the electronic device 100 is tagged on a POS at the time of boarding the bus, a card image 850 capable of payment of a transportation card together with the fingerprint image 710. In other words, the electronic device 100 can display the card image 850 based on information that the bus has been boarded based on location information and/or a signal received by the POS device.

When a fingerprint is sensed by the touched finger, the controller performs an authentication procedure and performs a payment function using a card selected by the touch input. When the payment function is performed, the touch screen displays a result screen 920 in one region for a specific time period. When the fingerprint image 710 is displayed in an inactive state of the touch screen, the result screen 920 is displayed for a specific period of time and the touch screen is switched to an inactive state.

Figure 10C:
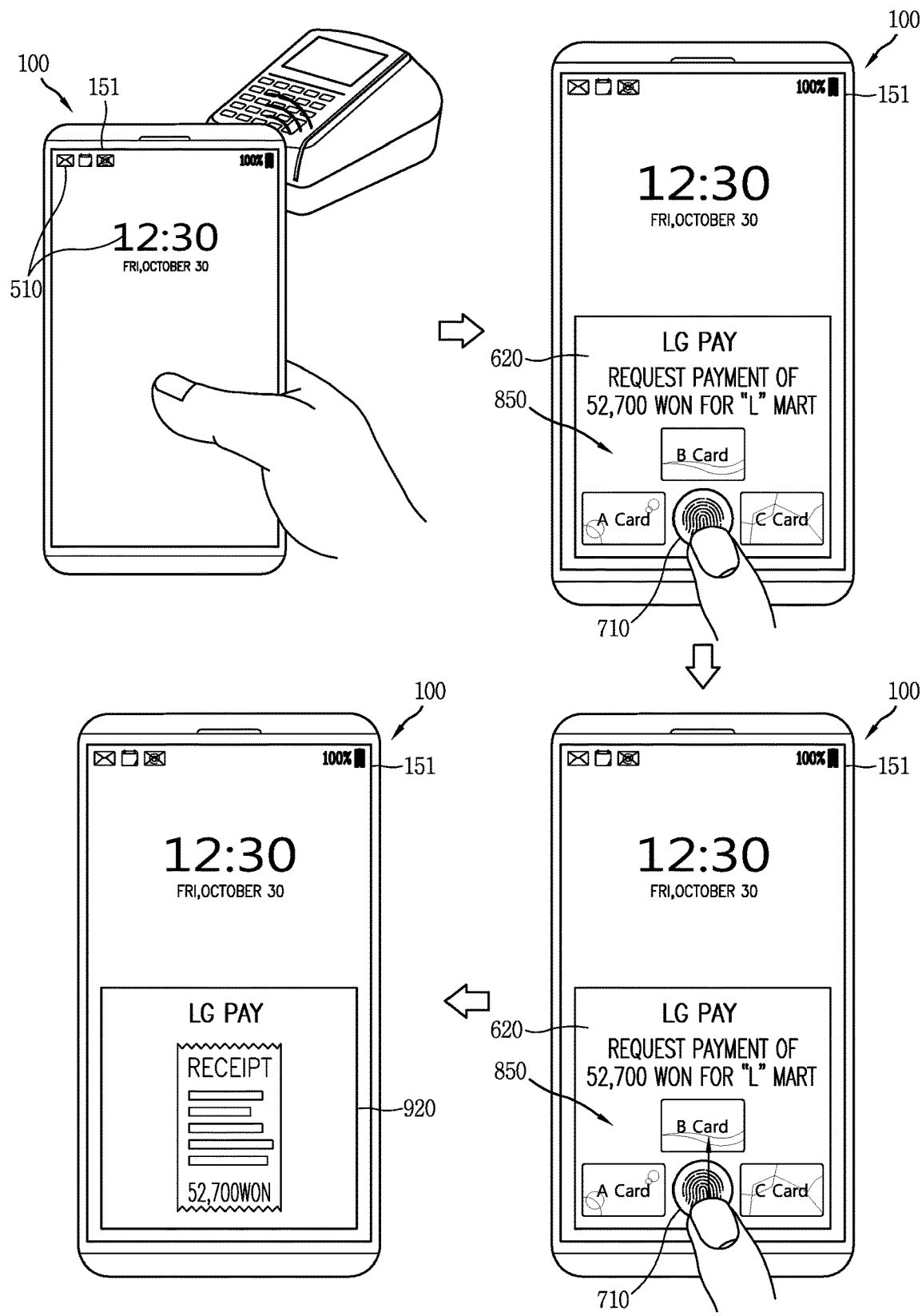

Referring to FIG. 10C, the touch screen displays a standby image 510 in an inactive state, and in this case no touch input is received. The controller 180 controls the touch screen to display payment information 850 based on signals (MST, NFC signals) received from an external POS device. The payment information 850 includes payment request terminal information and a payment amount, and includes card images corresponding to the payment card. The card images are displayed adjacent to the fingerprint image 710.

The controller 180 senses a fingerprint based on a touch applied to the fingerprint image 710 to perform an authentication procedure. When the authentication process is performed, a payment function is executed based on card information corresponding to the card image selected based on the touch input. When a payment function is performed, the touch screen displays a result screen 920 according to the payment function.

The touch screen can maintain an inactive state so that the touch input is not received in a region other than a region displayed with the result screen 920 and the payment information 850. Further, the result screen 920 is maintained for a specific time period, and the touch screen is again switched to an inactive state after the specific time period elapses.

Figure 10D:
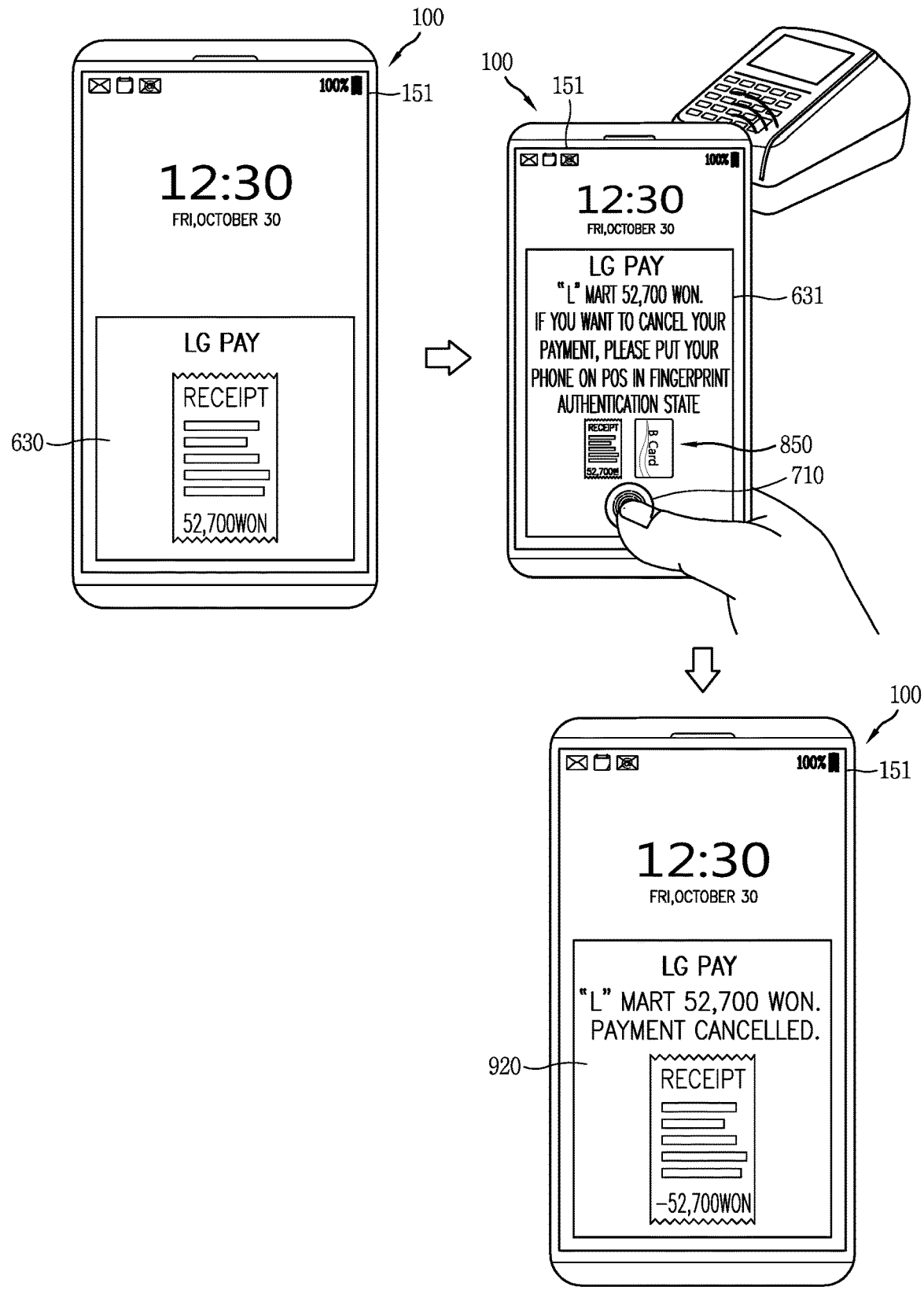

Referring to FIG. 10D, when payment information is received, the mobile terminal displays screen information 630 for notifying it. The payment information may correspond not only to payment by the mobile terminal but also to event information for notifying payment performed by another payment device.

When a specific type of touch input is received at the payment information 630, the controller 180 displays card information 850 on which a payment function has been performed together with the fingerprint image 710. When a touch is applied to the fingerprint image 710, the touch screen senses a fingerprint at the second sensing resolution. When an authentication procedure is performed by the sensed fingerprint information, the controller 180 executes a function of canceling the payment. The touch screen displays cancellation information 920 in which the payment has been canceled on a result screen.

However, when an authentication procedure is not performed by a fingerprint sensed while the fingerprint image 710 is displayed, the cancellation function of the payment is not performed, and warning information indicating that authentication has failed can be displayed.

In addition, when another type of touch input is applied to the payment information 630, the touch screen may execute an application for notifying the payment information 630. For example, when the mobile terminal is in a locked state, a screen for entering a password for canceling the locked state can be displayed or an execution screen of the application can be displayed.

Figure 10E:
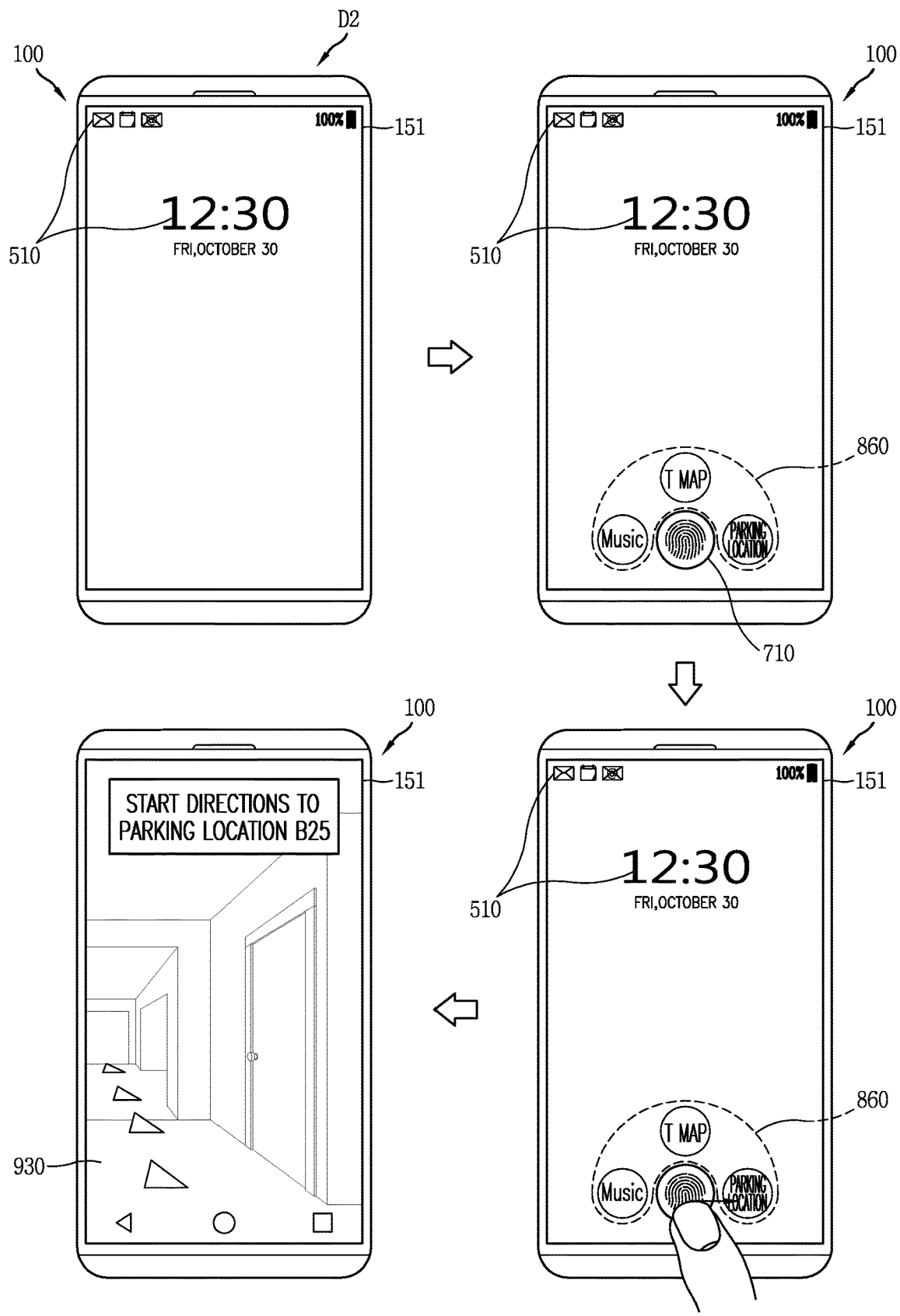

Referring to FIG. 10E, the mobile terminal recognizes the location of the mobile terminal based on location information or the received specific radio signal, and displays a function icon 860 corresponding to the location information together with the fingerprint image 710. The touch screen is in an inactive state, and controls the touch screen to have the second sensing resolution so as to display the fingerprint image 710 and the function icon 860, and sense a fingerprint in one region displayed with the fingerprint icon 710. The function icon 860 can be displayed to surround the fingerprint image 710. For example, when the location information is related to a parking lot and/or when the mobile terminal is adjacent to a predetermined vehicle, a function icon 860 related to a vehicle operation and/or parking is displayed.

The controller performs a fingerprint sensing and authentication procedure based on a touch applied to the fingerprint image 710, and performs a function corresponding to the selected function icon based on a continuous touch input. For example, when a parking position is selected based on a touch input, an application for guiding the vehicle to the parked position is executed, and the touch screen displays an execution screen 930 including the vehicle information.

Accordingly, a function associated with a current position or situation may be executed immediately without a control command by the user. In addition, since there is no need to perform an additional authentication procedure to cancel the lock state, a desired function may be performed more quickly.

A function icon disposed adjacent to the fingerprint image may correspond to an application frequently used by the user or may be set by the user. Accordingly, a function icon disposed in a region adjacent to the fingerprint image may correspond to a function irrelevant to currently collected information. For example, the fingerprint image 710 may be disposed adjacent to a home icon that enters a home screen page. Accordingly, when a plurality of icons are arranged to surround the fingerprint image, different functions may be performed based on the direction of a continuous touch input initially applied to the fingerprint image 710 and then moved.

Figure 11A:
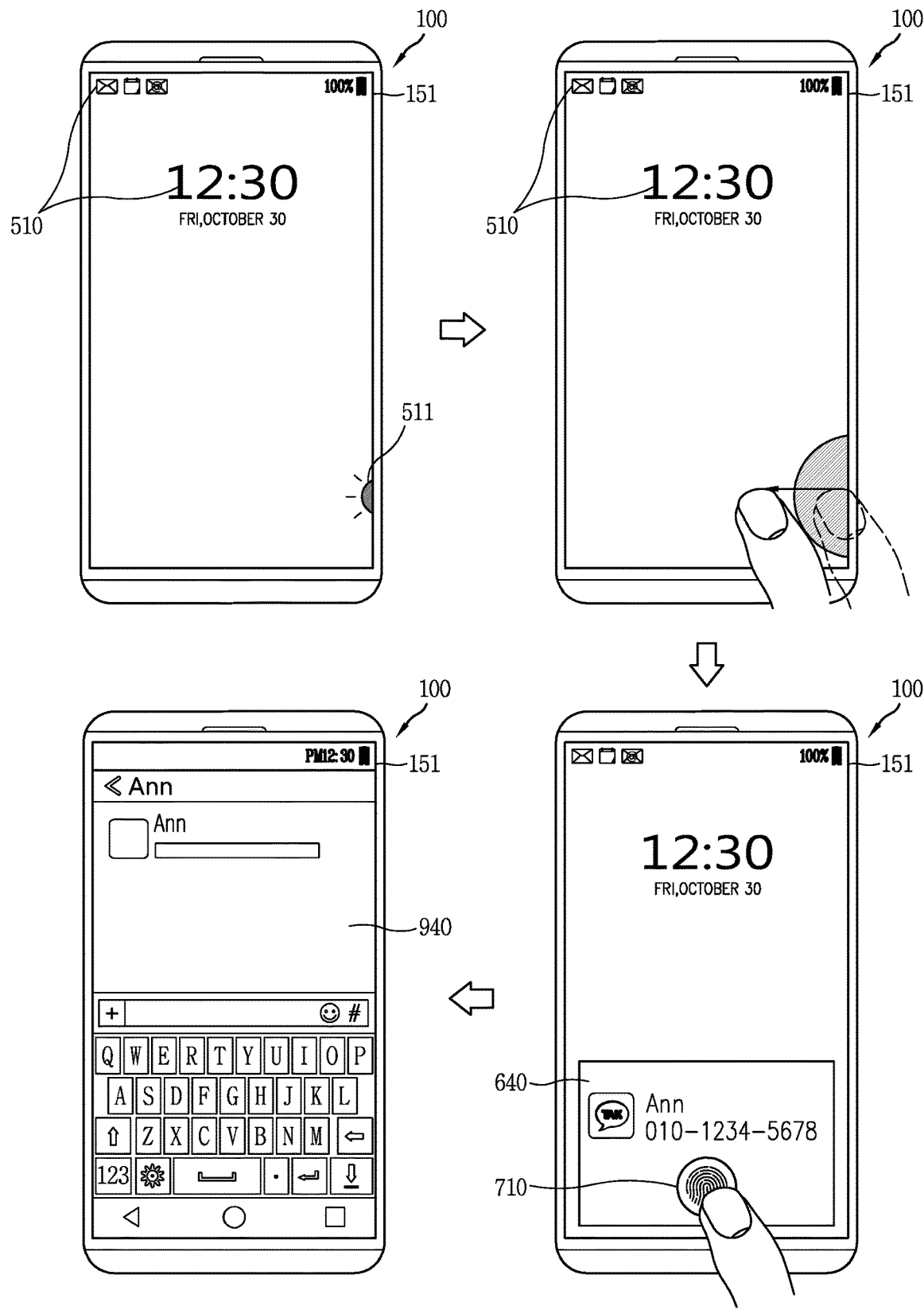
FIGS. 11A and 11B are conceptual views illustrating a control method when an event occurs.
Figure 11B:
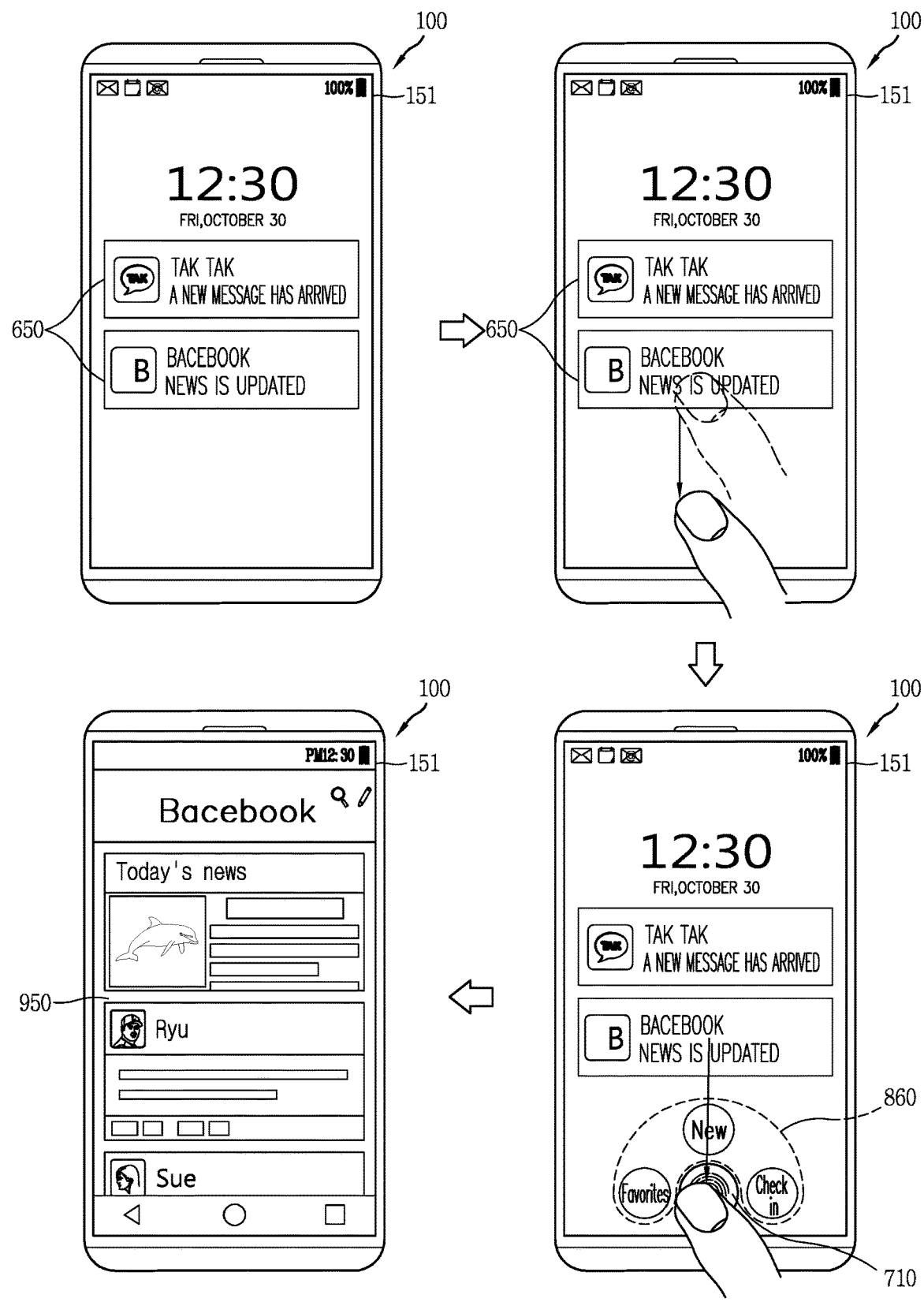

Next, FIGS. 11A and 11B are conceptual views illustrating a control method when an event occurs. Referring to FIG. 11A, a floating icon 511 is displayed when an event occurs. The floating icon 511 is displayed in one region of the touch screen when the touch screen is in an inactive state. The touch screen receives a touch input applied to the floating icon 511.

The touch screen displays a notification screen 640 related to the occurred event when a specific type of touch input is received on the floating icon 511. The notification screen 640 is displayed in one region of the touch screen, and includes information related to the event and information of an application, and the fingerprint image 710 is displayed in the one region. The control unit can control one region of the touch screen displayed with the fingerprint image 710 to sense a fingerprint at the second sensing resolution and ignore the reception of a touch input in the remaining region of the touch screen.

The controller 180 senses a fingerprint by a touch applied to the fingerprint image 710 to perform an authentication procedure. When an authentication procedure is completed (in a locked state, the lock state is canceled), the controller 180 controls the touch screen to execute the application and display an execution screen 940 of the application including information related to the event. Accordingly, the user can check the information of the received event using the floating icon 511, and enter a fingerprint image, thereby more conveniently controlling the authentication procedure and the execution of the application.

Referring to FIG. 11B, the touch screen displays a notification image 650 indicating an event occurred on the lock screen. When a plurality of events occur, a plurality of notification images 650 are sequentially listed. The notification images 650 may include application information of each generated event and brief information of the event. When a touch input is applied to the notification image 650, the controller 180 displays a lock screen for releasing the locked state when in the locked state, or displays an execution screen of an application corresponding to the notification image 650 when not in the locked state.

Further, when a specific type of touch input, for example, a dragging type of touch input, applied to the one notification image 650, is applied, the controller 180 controls the touch screen to display the fingerprint image 710 and sense a fingerprint at the second detection resolution.

Furthermore, the touch screen displays a function icon 860 adjacent to the fingerprint image 710. The function icon 860 may correspond to a function of an application corresponding to the notification image 650 that has received a touch input. The controller 180 senses the fingerprint based on the fingerprint icon 710 and a touch applied to the function icon 860, performs an authentication procedure, and executes a function of an application corresponding to the function icon 860.

The touch screen performs the function and displays an execution screen 950 of the application. Here, a touch input applied to the notification image 650 may correspond to a dragging type of touch input continuously applied to the function icon and the fingerprint image. Accordingly, the user can perform the related function of an application corresponding to an event that has occurred while releasing the locked state based on one continuous touch input.

FIG. 12 is a conceptual view illustrating a control method of displaying a related quick icon according to another embodiment of the present disclosure. Referring to FIG. 12(a), the touch screen 151 displays a floating icon 511 in an inactive state. The touch screen 151 does not sense a touch in the remaining region other than a region displayed with the floating icon 511.

The controller 180 displays a fingerprint image 710 based on a specific type of touch input applied to the floating icon 511 and controls the sensing resolution at the second sensing resolution in one region displayed with the fingerprint image 710. Accordingly, a fingerprint may be sensed based on a touch applied to a region displayed with the fingerprint image 710, and the controller 180 controls the touch screen to perform an authentication procedure, switch to an active state, and release the locked state according to the sensed fingerprint so as to display screen information 520.

Referring to FIG. 12(b), the touch screen displays a notification image 512 together with the standby image 510 when an event occurs. One region on the touch screen displayed with the notification image 512 does not receive a touch input in an inactive state. The controller 180 displays the floating icon 511 together with the standby image 510. Based on a touch input applied to the floating icon 511, the touch screen displays the fingerprint image 710 and senses a fingerprint at the second sensing resolution.

When authentication is successful based on the sensed fingerprint, the controller 180 displays event information 513 related to the event and displays a graphic image 820 for receiving a touch input to perform a function related to the event. For example, the graphic image 820 may correspond to deletion, reply, and sharing of event information. Accordingly, the user can perform a brief function of event information without releasing the locked state or executing an application related to the event.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device, comprising:
   a touch screen including a fingerprint sensing region overlapped with a touch sensing region and configured to sense a fingerprint input on the fingerprint sensing region with a second sensing resolution higher than a first sensing resolution of a touch input on the touch sensing region;
   a camera; and
   a controller configured to:
   display a notification information related to an event and a fingerprint image in the fingerprint sensing region on a notification screen of the touch screen, in response to the event requiring an authentication procedure,
   sense a fingerprint of a fingerprint touch applied to the fingerprint image,
   perform the authentication procedure based on the sensed fingerprint,
   display a plurality of function icons adjacent to the fingerprint image based on a result of the authentication procedure, and
   execute a function corresponding to one of the plurality of function icons when the fingerprint touch applied to the fingerprint image is dragged to the one of the plurality of function icons, wherein the function includes a first function of receiving a call, a second function of disconnecting a connected call and a video call function as a third function,
   wherein when the second function is executed, an entire region of the touch screen is switched to an inactive state,
   wherein when the third function is executed, an execution screen based on the third function is displayed in the notification screen, and
   wherein the camera is activated so that an image captured by the camera according to the execution of the third function and a received video image are displayed on the execution screen corresponding to the notification screen, and the remaining region of the notification screen is maintained to be an inactive state, and
   display a modified execution screen overlapping with the plurality of function icons when the third function is executed, wherein the modified execution screen is adjusted in sharpness and luminance to display the plurality of function icons.

2. The electronic device of claim 1, wherein the touch sensing region includes a plurality of sensing line portions arranged alternately with each other and a plurality of dummy line portions deactivated when the touch input is received.

3. The electronic device of claim 2, wherein a plurality of lines included in each of the plurality of sensing line portions are connected to form a sensing line to sense the touch input at the first sensing resolution.

4. The electronic device of claim 1, wherein the touch sensing region includes a first sensor layer formed with a plurality of first lines and a second sensor layer formed with a plurality of second lines extended in a direction intersecting the first lines, and
   wherein the plurality of first and second lines are respectively connected to a circuit board by one of a plurality of first and second switches.

5. The electronic device of claim 4, wherein the plurality of first lines connected to the first switches and the plurality of second lines connected to the first switches are grouped to form a plurality of sensing lines, respectively, to receive the touch input.

6. The electronic device of claim 5, further comprising:
   a plurality of grouping switches for connecting the plurality of grouped sensing lines to a single sensing line to receive the touch input.

7. The electronic device of claim 1, wherein the controller is further configured to:
   release a locked state of the electronic device and execute the function corresponding to the plurality of function icons in response to the touch input to the plurality of function icons and the result of the authentication procedure indicating a successful authentication procedure.

8. The electronic device of claim 7, wherein the controller is further configured to:

activate only a partial region of the touch screen to display the fingerprint image, and display an execution screen of the function in the partial region.

9. The electronic device of claim 1, wherein the controller is further configured to:

display a home screen on the touch screen, and in response to a touch and drag of an application icon on the home screen to the fingerprint image, lock a state of an application corresponding to the application icon when the authentication procedure is successful.

10. The electronic device of claim 1, wherein the controller is further configured to:

display an execution screen of an application on the touch screen, display a control icon on the touch screen for controlling a locking state of the application, in response to a specific type of touch to the control icon, display the fingerprint image, and control the application to be in a lock state when the control icon indicates the application is in the unlock state or control the application to be in the unlock state when the control icon indicates the application is in the lock state, in response to the fingerprint touch applied to the fingerprint image and the authentication procedure being successful.

11. The electronic device of claim 1, wherein the controller is further configured to:

display a preview image obtained by a camera on the touch screen, in response to a touch and drag of an image capture function icon of the plurality of function icons on the touch screen to the fingerprint image, capture an image corresponding to the preview image and store the captured image in a memory in a locked state.

12. The electronic device of claim 1, wherein the controller is further configured to:

display a preview image obtained by the camera on the touch screen, wherein one function icon of the plurality of function icons corresponds to a function associated with an image captured by the camera, and in response to the touch input applied to a function icon, capture the image and execute an application associated with the function icon using the image to send the captured image to an external device and a specific server.

13. The electronic device of claim 1, further comprising:

a plurality of sensors configured to collect specific information, wherein the plurality of function icons are associated with the specific information, and wherein the controller is further configured to display the plurality of function icons together with the fingerprint image.

14. The electronic device of claim 13, wherein the specific information corresponds to a wireless signal associated with a payment function, and wherein the controller is further configured to display a payment card image together with the fingerprint image based on the wireless signal.

15. The electronic device of claim 13, wherein the specific information corresponds to location information and the plurality of function icons correspond to an application associated with the location information, and wherein the controller is further configured to display the plurality of function icons together with the fingerprint image.

16. The electronic device of claim 1, wherein the controller is further configured to:

display a floating icon on the touch screen in an inactive state to indicate an occurrence of the event, and display the notification information on the touch screen together with the fingerprint image based on a touch input applied to the floating icon.

17. The electronic device of claim 1, wherein the controller is further configured to:

execute an application for responding to the event in response to the fingerprint touch applied to the fingerprint image and the authentication procedure being successful.

18. A method of controlling an electronic device including a touch screen including a fingerprint sensing region overlapped with a touch sensing region and configured to sense a fingerprint input on the fingerprint sensing region with a second sensing resolution higher than a first sensing resolution of a touch input on the touch sensing region, the method comprising:

displaying, via a controller of the electronic device, a notification information related to an event and a fingerprint image in the fingerprint sensing region on a notification screen of the touch screen, in response to the event requiring an authentication procedure;

sensing, via the controller, a fingerprint of a fingerprint touch applied to the fingerprint image;

performing, via the controller, the authentication procedure based on the sensed fingerprint;

displaying, via the controller, a plurality of function icons adjacent to the fingerprint image based on a result of the authentication procedure; and executing, via the controller, a function corresponding to one of the plurality of function icons when the fingerprint touch applied to the fingerprint image is dragged to the one of the plurality of function icons, wherein the function includes a first function of receiving a call, a second function of disconnecting a connected call and a video call function as a third function, wherein when the second function is executed, an entire region of the touch screen is switched to an inactive state, wherein when the third function is executed, an execution screen based on the third function is displayed in the notification screen, and wherein a camera on the electronic device is activated so that an image captured by the camera according to the execution of the third function and a received video image are displayed on the execution screen corresponding to the notification screen, and the remaining region of the notification screen is maintained to be an inactive state; and displaying, via the controller, a modified execution screen overlapping with the plurality of function icons when the third function is executed, wherein the modified execution screen is adjusted in sharpness and luminance to display the plurality of function icons.

19. The method of claim 18, wherein the touch sensing region includes a plurality of sensing line portions arranged alternately with each other and a plurality of dummy line portions deactivated when the touch input is received.

* * * * *